United States Patent
Tanaka et al.

(10) Patent No.: US 12,033,173 B2
(45) Date of Patent: Jul. 9, 2024

(54) TAXI MANAGEMENT DEVICE, TAXI OPERATION SYSTEM, AND FARE SETTING METHOD

(71) Applicant: DENSO TEN Limited, Kobe (JP)

(72) Inventors: Shinichi Tanaka, Kobe (JP); Shinichi Shiotsu, Kobe (JP); Haruki Shiraishi, Kobe (JP); Minoru Maehata, Kobe (JP); Miki Hitotsuya, Kobe (JP); Tomohiro Ikeda, Kobe (JP)

(73) Assignee: DENSO TEN Limited, Kobe (JP)

( * ) Notice: Subject to any disclaimer, the term of this patent is extended or adjusted under 35 U.S.C. 154(b) by 99 days.

(21) Appl. No.: 17/375,838

(22) Filed: Jul. 14, 2021

(65) Prior Publication Data
US 2022/0020044 A1 Jan. 20, 2022

(30) Foreign Application Priority Data
Jul. 16, 2020 (JP) .................... 2020-121822

(51) Int. Cl.
| | | |
|---|---|---|
| *G06Q 30/02* | (2023.01) |
| *G06F 40/263* | (2020.01) |
| *G06F 40/51* | (2020.01) |
| *G06Q 30/0207* | (2023.01) |
| *G07B 15/02* | (2011.01) |

(52) U.S. Cl.
CPC ....... *G06Q 30/0207* (2013.01); *G06F 40/263* (2020.01); *G06F 40/51* (2020.01); *G07B 15/02* (2013.01)

(58) Field of Classification Search
CPC ...... G06Q 30/024; G06Q 50/30; G06Q 50/10; G06F 40/51; G06F 40/263; G07B 15/02; G06K 17/00
See application file for complete search history.

(56) References Cited

U.S. PATENT DOCUMENTS

2007/0136068 A1\* 6/2007 Horvitz .................. G06F 40/58
704/E15.019
2014/0172411 A1\* 6/2014 Kim ........................ G06F 40/51
704/2
(Continued)

FOREIGN PATENT DOCUMENTS

JP 2002-163354 A 6/2002
JP 2011-076417 A 4/2011
(Continued)

OTHER PUBLICATIONS

Hosni et al., An Optimization-based Approach for Passenger to Shared Taxi Allocation, SoftCOM 2012, 20th International Conference on Software, Telecommunications and Computer Networks (pp. 1-7).\*

*Primary Examiner* — David J Stoltenberg
(74) *Attorney, Agent, or Firm* — Oliff PLC

(57) ABSTRACT

A taxi management device includes: an information acquisition unit that acquires first information including information specifying a use language of a first person and second information including information specifying an interpretable language of a second person; and a discount setting unit that performs discount setting of a fare of the second person at a time of ride-sharing of taxi by the first person and the second person based on the first information and the second information.

13 Claims, 15 Drawing Sheets

(56) References Cited

U.S. PATENT DOCUMENTS

| | | | | |
|---|---|---|---|---|
| 2014/0180671 A1* | 6/2014 | Osipova | ................ | G06F 40/263 |
| | | | | 704/8 |
| 2014/0337989 A1* | 11/2014 | Orsini | ................... | H04L 51/212 |
| | | | | 726/26 |
| 2019/0087875 A1* | 3/2019 | Morioka | ............ | G01C 21/3438 |
| 2021/0142373 A1* | 5/2021 | Takahara | ............... | G06Q 50/10 |

FOREIGN PATENT DOCUMENTS

| | | | | | |
|---|---|---|---|---|---|
| JP | 2014-146261 | A | | 8/2014 | |
| JP | 2022018604 | | * | 1/2022 | ............. G06F 40/58 |
| KR | 20090038576 | A | * | 10/2007 | ......... G06Q 30/0269 |
| KR | 20080049969 | | * | 6/2008 | ............ G06Q 50/40 |
| KR | 20160107997 | A | * | 3/2015 | ......... G06Q 30/0281 |

\* cited by examiner

FIG. 5

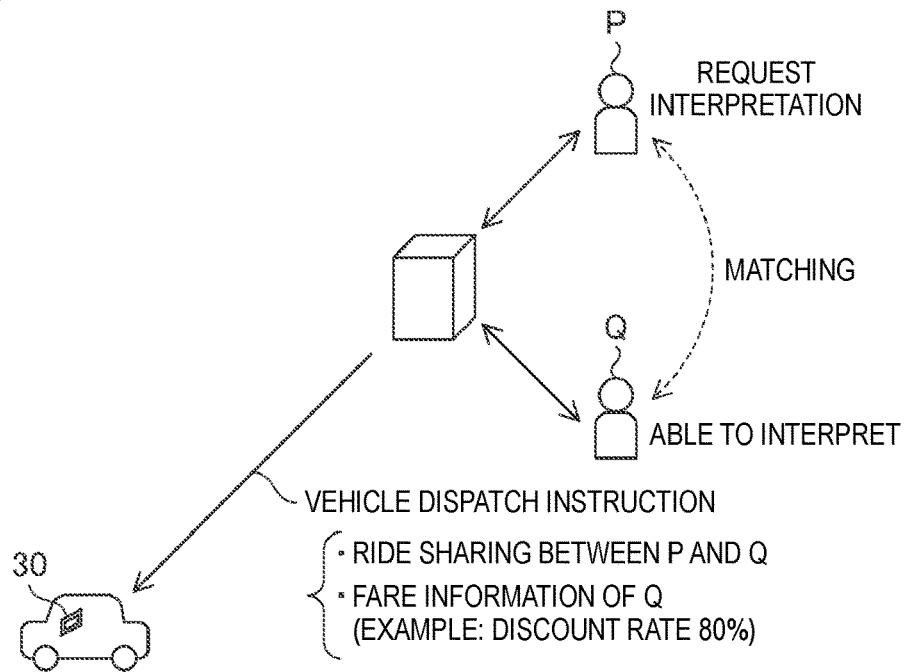

REQUEST INTERPRETATION

MATCHING

ABLE TO INTERPRET

VEHICLE DISPATCH INSTRUCTION
- RIDE SHARING BETWEEN P AND Q
- FARE INFORMATION OF Q
  (EXAMPLE: DISCOUNT RATE 80%)

FIG. 6

VEHICLE DISPATCH APPLICATION REGISTRANT DATA — D1

| PERSONAL ID | NAME | ATTRIBUTE INFORMATION | PERSONAL AUTHENTICATION INFORMATION |
|---|---|---|---|
| A0001 | Mikel JJ | ---- | PASSPORT |
| A0002 | Tiger WW | ---- | PASSPORT |
| A0003 | WANG HAOYU | ---- | PASSPORT |
| A0004 | CHEN MING | ---- | DRIVING LICENSE |
| A0005 | Kurt HH | ---- | PASSPORT |
| . | . | . | . |
| . | . | . | . |
| . | . | . | . |

UNIQUE INFORMATION OF INTERPRETATION-REQUIRING PERSON OF A0001

UNIQUE INFORMATION OF INTERPRETATION-REQUIRING PERSON OF A0002

※ ATTRIBUTE INFORMATION:
USE LANGUAGE, NATIONALITY, AGE, GENDER, HOBBY AND THE LIKE

FIG. 7

INTERPRETATION REGISTRANT DATA D2

| INTERPRETATION REGISTRANT ID | NAME | ATTRIBUTE INFORMATION | PERSONAL AUTHENTICATION INFORMATION | INTERPRETATION ABILITY INFORMATION |
|---|---|---|---|---|
| B0001 | DENSO TENTA | — — | DRIVING LICENSE | — — |
| B0002 | KOBE HANAKO | — — | DRIVING LICENSE | — — |
| B0003 | HYOGO ICHIRO | — — | PASSPORT | — — |
| B0004 | KANSAI MAKOTO | — — | DRIVING LICENSE | — — |
| B0005 | OSAKA TARO | — — | PASSPORT | — — |
| ... | ... | ... | ... | ... |

- UNIQUE INFORMATION OF INTERPRETATION REGISTRANT OF B0001
- UNIQUE INFORMATION OF INTERPRETATION REGISTRANT OF B0002

※ ATTRIBUTE INFORMATION: USE LANGUAGE, NATIONALITY, AGE, GENDER, HOBBY AND THE LIKE

※ INTERPRETATION ABILITY INFORMATION: INTERPRETABLE LANGUAGE, INTERPRETATION LEVEL (PROFICIENCY LEVEL OF INTERPRETATION)

FIG. 8

| NAME | INTERPRETATION ABILITY INFORMATION | |
|---|---|---|
| | INTERPRETABLE LANGUAGE | INTERPRETATION LEVEL |
| 510 — DENSO TENTA | ENGLISH | LV2 |
| | CHINESE | LV1 |
| | FRENCH | LV3 |
| 520 — KOBE HANAKO | GERMAN | LV4 |
| | SWAHILI | LV1 |
| 530 — HYOGO ICHIRO | CHINESE | LV2 |
| ... | ... | ... |

FIG. 9

LANGUAGE CERTIFICATION DATA

| NAME | LANGUAGE TYPE | RANK |
|---|---|---|
| 510 — DENSO TENTA | ENGLISH | B |
| | CHINESE | A |
| | FRENCH | C |
| 520 — KOBE HANAKO | GERMAN | D |
| | SWAHILI | A |
| 530 — HYOGO ICHIRO | CHINESE | B |
| ⋮ | ⋮ | ⋮ |

DISCOUNT RATE DATA

| NON-REFERENCE LANGUAGE ↓ | DISCOUNT RATE ($k_D$) | | | |
|---|---|---|---|---|
| | INTERPRETATION LEVEL | | | |
| | LV1 | LV2 | LV3 | LV4 |
| ENGLISH | 60% | 50% | 40% | 20% |
| CHINESE | 70% | 60% | 50% | 30% |
| FRENCH | 80% | 70% | 60% | 40% |
| GERMAN | 90% | 80% | 70% | 50% |
| SWAHILI | 100% | 90% | 80% | 60% |
| ⋮ | ⋮ | ⋮ | ⋮ | ⋮ |

DISCOUNT FEE DATA

| NON-REFERENCE LANGUAGE | DISCOUNT FEE ($F_D$) | | | |
|---|---|---|---|---|
| | INTERPRETATION LEVEL | | | |
| | LV1 | LV2 | LV3 | LV4 |
| ENGLISH | 1000 YEN | 800 YEN | 600 YEN | 400 YEN |
| CHINESE | 1200 YEN | 1000 YEN | 800 YEN | 600 YEN |
| FRENCH | 1400 YEN | 1200 YEN | 1000 YEN | 800 YEN |
| GERMAN | 1600 YEN | 1400 YEN | 1200 YEN | 1000 YEN |
| SWAHILI | 2000 YEN | 1800 YEN | 1600 YEN | 1400 YEN |
| ⋮ | ⋮ | ⋮ | ⋮ | ⋮ |

EXTRA-FARE RATE DATA D4

| NON-REFERENCE LANGUAGE | EXTRA-FARE RATE ($k_U$) |
|---|---|
| ENGLISH | 10% |
| CHINESE | 15% |
| FRENCH | 20% |
| GERMAN | 20% |
| SWAHILI | 30% |
| ⋮ | ⋮ |

FIG. 22

EXTRA-FEE DATA $D4a$

| NON-REFERENCE LANGUAGE | EXTRA-FEE ($F_U$) |
|---|---|
| ENGLISH | 500 YEN |
| CHINESE | 700 YEN |
| FRENCH | 900 YEN |
| GERMAN | 900 YEN |
| SWAHILI | 1500 YEN |
| ⋮ | ⋮ |

TAXI MANAGEMENT DEVICE, TAXI OPERATION SYSTEM, AND FARE SETTING METHOD

CROSS-REFERENCE TO RELATED APPLICATIONS

This application is based on and claims priorities under 35 USC 119 from Japanese Patent Application No. 2020-121822 filed on Jul. 16, 2020, the content of which is incorporated herein by reference.

TECHNICAL FIELD

The present invention relates to a taxi management device, a taxi operation system, and a fare setting method.

BACKGROUND ART

In some countries (for example, Japan), people from different countries whose use languages are different from an official language of the country (Japanese in Japan) often use a taxi.

CITATION LIST

Patent Literature

Patent Literature 1: JP-A-2014-146261
Patent Literature 2: JP-A-2011-76417

SUMMARY OF INVENTION

At this time, the taxi user from different countries often feel anxiety about having a conversation in the taxi, and trouble such as the need of the taxi user not being correctly presented to a driver may occur. In particular, for example, after an event in an international event venue ends (for example, after a game in an international meeting venue of sports ends), a large number of people from different countries having different nationalities move from the venue at the same time, and when communication with drivers does not proceed smoothly, a situation of great disorder may be caused.

On the other hand, many taxi users have an interpretation ability. In a case where a taxi user from a different country and a taxi user who has an interpretation ability shares a common taxi, a problem of language barrier in taxi use is solved or alleviated. At this time, if a service having some merits for taxi users having an interpretation ability is provided, ride-sharing as described above is promoted, and it is considered that services advantageous for all taxi users can be implemented.

An object of the present invention is to provide a taxi management device, a taxi operation system, and a fare setting method capable of giving merits to both taxi users using ride-sharing in association with language interpretation.

[1] According to the present invention, there is provided a taxi management device including: an information acquisition unit that acquires first information including information specifying a use language of a first person and second information including information specifying an interpretable language of a second person; and a discount setting unit that performs discount setting of a fare of the second person at a time of ride-sharing of taxi by the first person and the second person based on the first information and the second information.

[2] In the taxi management device of [1], the taxi may be operated in a country where a reference language is used as an official language, the use language of the first person may be different from the reference language, and the discount setting unit may set the fare of the second person at the time of the ride-sharing to be lower in a case where the second person is able to perform interpretation between the reference language and the use language of the first person than a fare of the second person in a case where the second person is not able to perform interpretation between the reference language and the use language of the first person.

[3] In the taxi management device of [2], the second information may include a proficiency level of interpretation of the second person, and, in a case where the second person is able to perform interpretation between the reference language and the use language of the first person, the discount setting unit may perform discount setting of the fare of the second person at the time of the ride-sharing according to the proficiency level of the interpretation.

[4] In the taxi management device of [3], in a case where the second person is able to perform interpretation between the reference language and the use language of the first person, the discount setting unit may set the fare of the second person at the time of the ride-sharing to be lower as the proficiency level increases.

[5] The taxi management device of [3] or [4] may further include: an interpretation ability information registration unit that registers and retains interpretation ability information of each of a plurality of interpretation registrants including the second person, and, in the interpretation ability information, an interpretable language may be specified for each interpretation registrant, interpretation of the interpretable language may be interpretation between the reference language and a non-reference language, a proficiency level of interpretation may be defined for each interpretation registrant and for each interpretable language in the interpretation ability information, and the second information may include the interpretation ability information of the second person.

[6] The taxi management device of [5] may further include: a matching processing unit that, based on matching information, selects the first person from among a plurality of users including one or more interpretation registrants, and selects a user as the second person who is able to perform interpretation between the reference language and the use language of the first person, and the matching information may include a departure place and a destination of each user in taking the taxi, a use language of each user, and interpretation ability information of the one or more interpretation registrants.

[7] The taxi management device of any one of [1] to [4] may further include: a communication unit that transmits a setting result of the discount setting unit to an in-vehicle device mounted on the taxi.

[8] The taxi management device of any one of [2] to [4] may further include: an extra-fare setting unit that performs extra-fare setting of a fare of the first person at a time of ride-sharing of taxi by the first person and the second person based on the first information and the second information, and the extra-fare setting unit may set the fare of the first person at the time of the ride-sharing to be higher in a case where the second person is able to perform interpretation between the reference language and the use language of the first person than a fare of the first person in a case where the second person is not able to perform interpretation between the reference language and the use language of the first person.

[9] The taxi management device of [8] may further include a communication unit that transmits a setting result of the extra-fare setting unit to an in-vehicle device mounted on the taxi.

[10] According to the present invention, there is provided a taxi operation system, including: the taxi management device of any one of [1] to [9]; and an in-vehicle device that is mounted on a taxi and is communicable with the taxi management device.

[11] According to the present invention, there is provided a fare setting method including: based on first information including information specifying a use language of a first person and second information including information specifying an interpretable language of a second person, performing discount setting of a fare of the second person at a time of ride-sharing of taxi by the first person and the second person.

According to the present invention, it is possible to provide a taxi management device, a taxi operation system, and a fare setting method capable of giving merits to both taxi users using ride-sharing in association with language interpretation.

BRIEF DESCRIPTION OF DRAWINGS

FIG. 5 is a diagram illustrating an overview of a special vehicle dispatch service provided by the taxi operation system according to the embodiment of the present invention.

FIG. 6 is a configuration diagram of vehicle dispatch application registrant data retained in the server device according to the embodiment of the present invention.

FIG. 7 is a configuration diagram of interpretation registrant data retained in the server device according to the embodiment of the present invention.

FIG. 8 is a table illustrating an example of interpretation ability information in the interpretation registrant data of FIG. 7.

FIG. 9 is a configuration diagram of language certification data used for setting an interpretation level in the interpretation ability information of FIG. 8.

FIG. 10 is a configuration diagram of discount rate data set in the server device according to the embodiment of the present invention.

FIG. 22 is a configuration diagram of extra-fare data set in the server device according to the seventh example belonging to the embodiment of the present invention.

DESCRIPTION OF EMBODIMENTS

Figure 1:
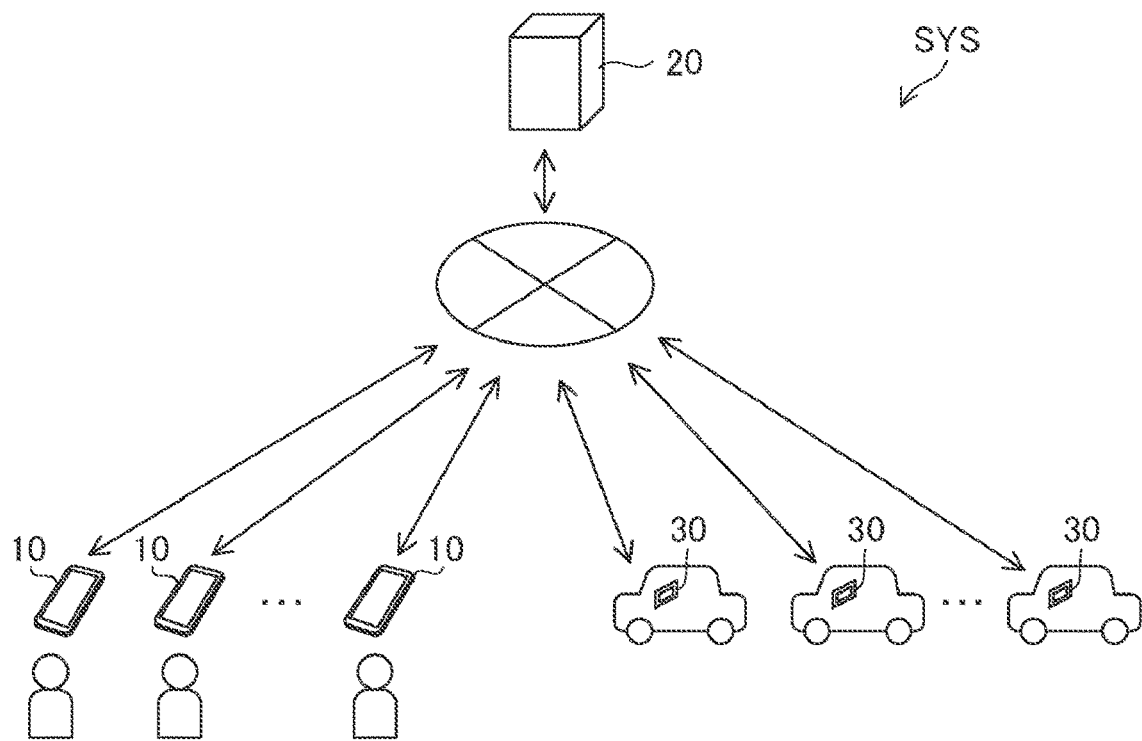
FIG. 1 is an overall configuration diagram of a taxi operation system according to an embodiment of the present invention.

Hereinafter, an example of an embodiment of the present invention will be specifically described with reference to the drawings. In the drawings to be referred to, the same parts are denoted by the same reference signs, and a repeated description of the same parts will be omitted in principle. In the present specification, in order to simplify the description, a symbol or a sign that refers to information, a signal, a physical quantity, a member, or the like is described so that a name of the information, the signal, the physical quantity, the member, or the like corresponding to the symbol or the sign may be omitted or abbreviated. For example, vehicle dispatch application registrant data referred to as "D1" described later (see FIG. 6) may be referred to as vehicle dispatch application registrant data D1 or may be abbreviated as data D1, and all of them indicate the same data.

FIG. 1 illustrates an overall configuration of a taxi operation system SYS according to the embodiment of the present invention. The taxi operation system SYS includes one or more terminal devices 10, a server device 20, and one or more in-vehicle devices 30. The server device 20 is an example of a taxi management device according to the present invention. The server device 20 may be configured with a plurality of computer devices that are connected to each other in a wireless or wired manner while being separated from each other. A plurality of taxies are operated under the taxi operation system SYS.

The terminal device 10 is a device possessed and operated by a user, and is, for example, a smartphone, a tablet, or a personal computer possessed by the user. The user is a user of the taxi operation system SYS, and may be a passenger who gets on a taxi or is scheduled to get on a taxi. The server device 20 is wirelessly connected to each of the terminal devices 10 and each of the in-vehicle devices 30 via a predetermined communication network (mobile communication network), and is capable of wireless bidirectional communication with each of the terminal devices 10 and each of the in-vehicle devices 30. The in-vehicle device 30 is an electronic device mounted on each taxi belonging to the taxi operation system SYS. The in-vehicle device 30 is configured as, for example, a tablet-type electronic device.

Figure 2:
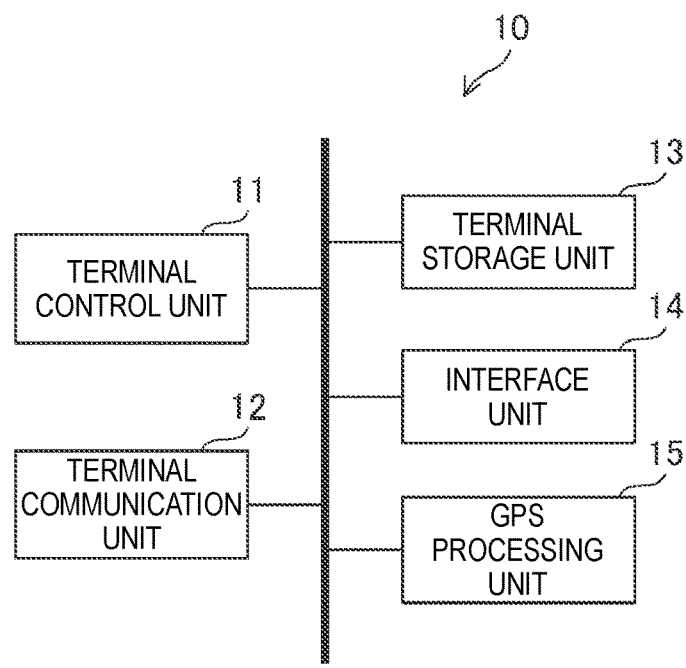
FIG. 2 is a schematic functional block diagram of a terminal device according to the embodiment of the present invention.

FIG. 2 is a schematic functional block diagram of the terminal device 10. The terminal device 10 includes a terminal control unit 11, a terminal communication unit 12, a terminal storage unit 13, an interface unit 14, and a GPS processing unit 15. In addition, various other functional components not illustrated in FIG. 2 may be provided in the terminal device 10, but the other functional components are not illustrated.

The terminal control unit 11 is configured with a central processing unit (CPU), a read only memory (ROM), a random access memory (RAM), and the like, and implements various functions and controls all operations of the terminal device 10 by the CPU executing a program stored in the ROM. The terminal communication unit 12 executes processing for performing wireless communication with a device different from the terminal device 10. Among communication partners of the terminal device 10, the server device 20 is included. The terminal storage unit 13 is configured with a ROM, a RAM, and the like, and stores arbitrary information and data under the control of the terminal control unit 11. The interface unit 14 is a man-machine interface between the terminal device 10 and an operator (corresponding to the above-described user) of the terminal device 10, and includes a display screen, an operation portion, a microphone, a speaker, and the like.

The GPS processing unit 15 detects a current location of the terminal device 10 by receiving signals from a plurality of GPS satellites forming a global positioning system (GPS), and generates terminal location information indicating the current location of the terminal device 10. In the terminal location information, the current location of the terminal device 10 is expressed by longitude and latitude on the earth. The terminal location information is sequentially generated at a predetermined cycle. Terminal location information of a certain terminal device 10 represents a current location of a user who possesses the terminal device 10.

Figure 3:
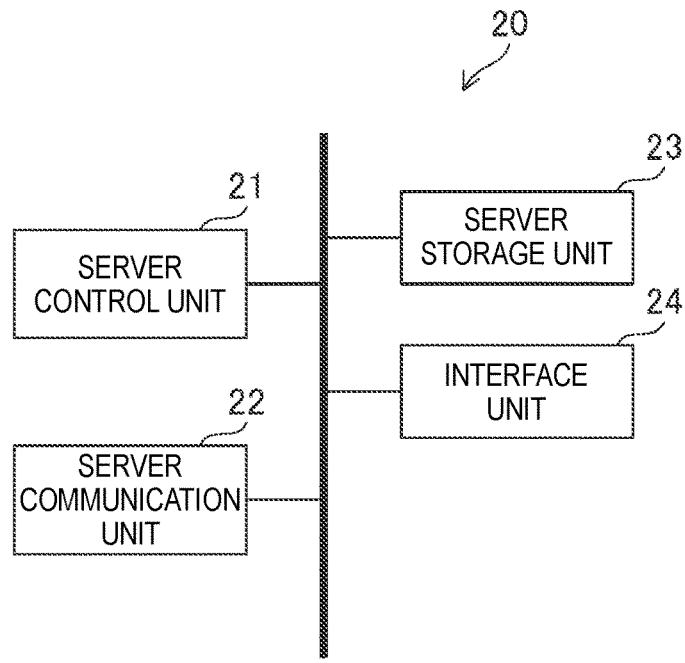
FIG. 3 is a schematic functional block diagram of a server device according to the embodiment of the present invention.

FIG. 3 is a schematic functional block diagram of the server device 20. The server device 20 includes a server control unit 21, a server communication unit 22, a server storage unit 23, and an interface unit 24. In addition, various other functional components not illustrated in FIG. 3 may be provided in the server device 20, but the other functional components are not illustrated.

The server control unit 21 is configured with a CPU, a ROM, a RAM, and the like, and implements various functions and controls all operations of the server device 20 by the CPU executing a program stored in the ROM. The server communication unit 22 executes processing for performing wireless communication with a device different from the server device 20. Among communication partners of the server device 20, the terminal device 10 and the in-vehicle device 30 are included. The server storage unit 23 is configured with a ROM, a RAM, and the like, and stores arbitrary information and data under the control of the server control unit 21. The interface unit 24 is a man-machine interface between the server device 20 and an operator of the server device 20, and includes a display screen, an operation portion, a microphone, a speaker, and the like.

Figure 4:
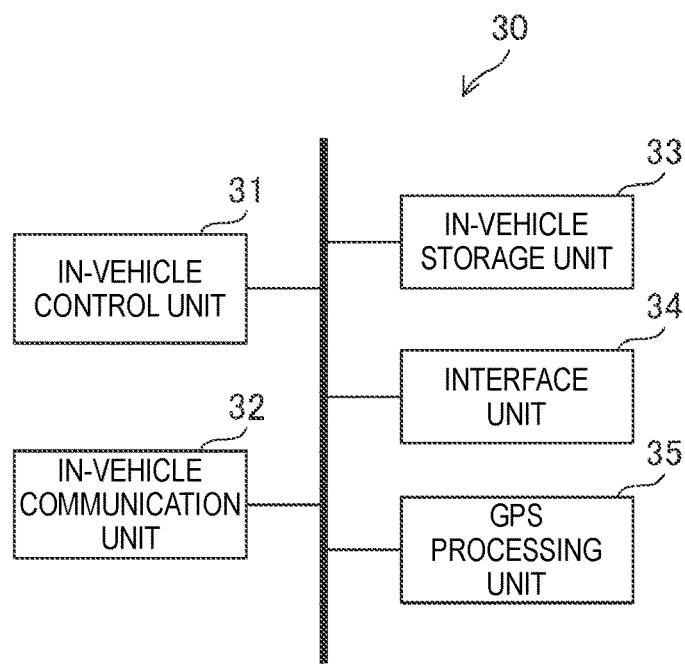
FIG. 4 is a schematic functional block diagram of an in-vehicle device according to the embodiment of the present invention.

FIG. 4 is a schematic functional block diagram of the in-vehicle device 30. The in-vehicle device 30 includes an in-vehicle control unit 31, an in-vehicle communication unit 32, an in-vehicle storage unit 33, an interface unit 34, and a GPS processing unit 35. In addition, various other functional components not illustrated in FIG. 4 may be provided in the in-vehicle device 30, but the other functional components are not illustrated.

The in-vehicle control unit 31 is configured with a CPU, a ROM, a RAM, and the like, and implements various functions and controls all operations of the in-vehicle device 30 by the CPU executing a program stored in the ROM. The in-vehicle communication unit 32 executes processing for performing wireless communication with a device different from the in-vehicle device 30. Among communication partners of the in-vehicle device 30, the server device 20 is included. The in-vehicle storage unit 33 is configured with a ROM, a RAM, and the like, and stores arbitrary information and data under the control of the in-vehicle control unit 31. The interface unit 34 is a man-machine interface between the in-vehicle device 30 and an operator of the in-vehicle device 30 (corresponding to a driver of a taxi on which the in-vehicle device 30 is mounted), and includes a display screen, an operation portion, a microphone, a speaker, and the like.

The GPS processing unit 35 detects a current location of the in-vehicle device 30 by receiving signals from a plurality of GPS satellites forming the GPS, and generates vehicle location information indicating the current location of the in-vehicle device 30. In the vehicle location information, the current location of the in-vehicle device 30 is expressed by longitude and latitude on the earth. The vehicle location information is sequentially generated at a predetermined cycle. Vehicle location information of a certain in-vehicle device 30 represents a current location of a taxi on which the in-vehicle device 30 is mounted.

Regarding transmission and reception of signals in the terminal device 10, the server device 20, and the in-vehicle device 30, reception of an arbitrary signal or information specifically refers to reception in the terminal communication unit 12, the server communication unit 22, and the in-vehicle communication unit 32 (in other words, reception using the terminal communication unit 12, the server communication unit 22, and the in-vehicle communication unit 32), and transmission of an arbitrary signal or information specifically refers to transmission from the terminal communication unit 12, the server communication unit 22, and the in-vehicle communication unit 32 (in other words, transmission using the terminal communication unit 12, the server communication unit 22, and the in-vehicle communication unit 32), but in the following description, description of the terminal communication unit 12, the server communication unit 22, and the in-vehicle communication unit 32 may be omitted.

The taxi operation system SYS and a taxi in the taxi operation system SYS are operated in a country where a predetermined reference language is used as an official language. In the present embodiment, it is assumed that the taxi operation system SYS and the taxi in the taxi operation system SYS are operated in Japan. Therefore, the reference language is Japanese. Among drivers of taxi, some drivers may be able to have a conversation in a language other than the reference language (Japanese in this case), but it is assumed that the drivers of taxi basically accurately understand only the reference language and have a conversation in the reference language. That is, the use language of each driver of taxi is Japanese. In the present embodiment, interpretation means interpretation between the reference language and a language other than the reference language (hereinafter, referred to as a non-reference language). In order to make the description easy to understand, a language used by a large number of people in the country (region) is regarded as a language serving as a reference in the country, and the language is referred to as a reference language in that sense.

An overview of a characteristic vehicle dispatch service (hereinafter, referred to as a special vehicle dispatch service) provided through the taxi operation system SYS will be described with reference to FIG. 5. In FIG. 5, a person P and a person Q represent a first user and a second user, respectively. Since a use language of the person P is different from the reference language, the person P feels anxious about a conversation in a taxi and requests interpretation when using a taxi. The person Q has an ability to interpret between the use language of the person P and the reference language. That is, the use language of the person P is included in interpretable languages of the person Q. The server device 20 performs user matching of allowing users to share one taxi, based on movement request information (a departure place, a destination, and the like in taking a taxi) and a use language of each of a plurality of users, and an interpretable language of each user having an interpretation ability, and the like. The ride-sharing means that a plurality of persons (a plurality of users) ride together in one taxi. Needless to say, the plurality of persons riding together refer to a plurality of persons excluding the driver. In FIG. 5, as a result of the matching, the person Q is selected as a person who should share a ride with the person P. At this time, the server device 20 sets a fare of the person Q to be low or zero in consideration of the interpretation ability, interpretation work, and the like of the person Q, and transmits a setting result thereof and a vehicle dispatch instruction containing a departure place and a destination to the in-vehicle device 30 of a taxi the persons P and Q should share. Thereafter, when the persons P and Q actually share one taxi, the fare of the person Q is set to zero or lower than a reference fare according to the setting result.

Accordingly, the anxiety of the person P about language is eliminated, and at the same time, the person Q can use the taxi for free or at a low fare, so that a service that is advantageous for both can be provided.

The special vehicle dispatch service is implemented mainly by the server device 20. The configuration and operation of the server device 20 for implementing the special vehicle dispatch service will be described in detail.

FIGS. 6 and 7 illustrate structures of the vehicle dispatch application registrant data D1 and interpretation registrant data D2 stored and retained in the server storage unit 23. It is assumed that a predetermined application program (hereinafter, referred to as a vehicle dispatch application) for using the special vehicle dispatch service is installed in advance in each terminal device 10, and the vehicle dispatch application can be executed by the terminal control unit 11 in each terminal device 10. In a state where the vehicle dispatch application is activated in each terminal device 10, each user inputs own unique information to each terminal device 10 through the interface unit 14. Accordingly, the unique information of each user is transmitted from each terminal device 10 to the server device 20, and the unique information of each user is stored in the vehicle dispatch application registrant data D1 or the interpretation registrant data D2.

Each user of the taxi operation system SYS may be one of the persons P and Q in FIG. 5. A user who can participate as the person P in the special vehicle dispatch service is particularly referred to as an interpretation-requiring person, and a user who can participate as the person Q in the special vehicle dispatch service is particularly referred to as an interpretation registrant. Unique information of each interpretation-requiring person is stored in the data D1, and unique information of each interpretation registrant is stored in the data D2. After the storage of the unique information, the special vehicle dispatch service is actually operated.

In the vehicle dispatch application registrant data D1, a plurality of personal IDs are set, and one interpretation-requiring person is associated with each personal ID, and unique information of the one interpretation-requiring person is included in the data D1. Unique information of a certain interpretation-requiring person includes a name, attribute information, and personal authentication information of the interpretation-requiring person. In order to prevent complication of the drawing, details of the attribute information are not shown in the table of FIG. 6. Attribute information of a certain interpretation-requiring person is information indicating an attribute of the interpretation-requiring person, and includes a use language, a nationality, an age, a gender, a hobby, and the like of the interpretation-requiring person. When a certain interpretation-requiring person can have a conversation in any one of a plurality of languages, a main language selected by the interpretation-requiring person from among the plurality of languages may be registered as the use language. Personal authentication information of a certain interpretation-requiring person is information for authenticating identification of the interpretation-requiring person, and is included in the data D1 for the purpose of preventing a crime or the like. For example, a certain interpretation-requiring person can use a passport in order to authenticate his/her own identification, and in this case, the passport is personal authentication information of the interpretation-requiring person.

A plurality of interpretation registrant IDs are set in the interpretation registrant data D2, one interpretation registrant is associated with each interpretation registrant ID, and unique information of the one interpretation registrant is included in the data D2. Unique information of a certain interpretation registrant includes a name, attribute information, and personal authentication information of the interpretation registrant, and further includes interpretation ability information of the interpretation registrant. In order to prevent complication of the drawing, details of the attribute information and the interpretation ability information are not shown in the table of FIG. 7. Attribute information of a certain interpretation registrant is information indicating an attribute of the interpretation registrant, and includes a use language, a nationality, an age, a gender, a hobby, and the like of the interpretation registrant. When a certain interpretation registrant can have a conversation in any one of a plurality of languages, a main language selected by the interpretation registrant from among the plurality of languages may be registered as the use language. Personal authentication information of a certain interpretation registrant is information for authenticating identification of the interpretation registrant, and is included in the data D2 for the purpose of preventing a crime or the like. For example, a certain interpretation registrant can use a passport to authenticate his/her own identification, and in this case, the passport is personal authentication information of the interpretation registrant.

The interpretation ability information is information specifying an interpretable language and an interpretation level of an interpretation registrant. In the interpretation registrant data D2, the interpretation ability information is registered and retained for each interpretation registrant.

For a certain interpretation registrant, an interpretable language refers to a language that can be interpreted to the reference language by the interpretation registrant. For example, when a specific interpretation registrant can perform interpretation between Japanese and English and interpretation between Japanese and French, interpretable languages of the specific interpretation registrant are English and French.

The interpretation level indicates a proficiency level of interpretation. In the interpretation registrant data D2, the interpretation level is set to any one of levels LV1, LV2, LV3, and LV4 for each interpretable non-reference language (see FIG. 8). It is assumed that the level LV1 is the highest among the levels LV1, LV2, LV3, and LV4, and the interpretation level decreases in an order of the level LV1, level LV2, level LV3 and level LV4. It is expected that the proficiency level of interpretation increases as the interpretation level increases, and accordingly the interpretation can be performed more accurately and more smoothly.

FIG. 8 illustrates an example of the interpretation ability information of three interpretation registrants 510, 520, and 530. The information shown in FIG. 8 is included in the interpretation registrant data D2 of FIG. 7. The interpretation registrant 510 can perform interpretation between Japanese and English, interpretation between Japanese and Chinese, and interpretation between Japanese and French (that is, the interpretable languages of the interpretation registrant 510 include English, Chinese, and French), and it is registered in the interpretation registrant data D2 that these three types of interpretation can be performed. For the interpretation registrant 510, it is registered in the interpretation registrant data D2 that an interpretation level in the interpretation between Japanese and English, an interpretation level in the interpretation between Japanese and Chinese, and an interpretation level in the interpretation between Japanese and French are levels LV2, LV1, and LV3, respectively. The interpretation registrant 520 can perform interpretation between Japanese and German and interpretation between Japanese and Swahili (that is, the interpretable languages of the interpretation registrant 520 include German and Swahili), and it is registered in the interpretation registrant data D2 that these two types of interpretation can be performed. For the interpretation registrant 520, it is registered in the interpretation registrant data D2 that an interpretation level in the interpretation between Japanese and German and an interpretation level in the interpretation between Japanese and Swahili are levels LV4 and LV1, respectively. The interpretation registrant 530 can only perform interpretation between Japanese and Chinese (that is, only Chinese is included in the interpretable language of the interpretation registrant 530), and this fact is registered in the interpretation registrant data D2. For the interpretation registrant 530, it is registered in the interpretation registrant data D2 that an interpretation level in the interpretation between Japanese and Chinese is a level LV2. In this way, an interpretation level (proficiency level of interpretation) is defined for each interpretation registrant and for each interpretable language by the interpretation ability information in the interpretation registrant data D2.

In the server device 20, the server control unit 21 can determine the interpretation level of each interpretation registrant according to interpretation level estimation information. For example, language certification data as illustrated in FIG. 9 provided to the server device 20 can be used as the interpretation level estimation information. The language certification data represents a proficiency level of a non-reference language for each non-reference language of each interpretation registrant in a numerical form, and is generated based on a result of a language certification test carried out by a language certification institution. For example, when the interpretation registrant 510 acquires first, second, third, and fourth scores in an English language certification test for scoring a proficiency level of English, interpretation levels of English of the interpretation registrant 510 are set to levels LV1, LV2, LV3, and LV4, respectively. Here, (first score)>(second score)>(third score) >(fourth score). Note that it is assumed that any interpretation registrant including the interpretation registrant 510 can sufficiently handle the reference language. Therefore, if the interpretation registrant 510 can understand English, interpretation between Japanese and English is possible (the same applies to other interpretation registrants).

A method of providing the language certification data to the server device 20 is arbitrary. For example, the language certification data may be provided from a computer device installed in a language certification institution to the server device 20. Alternatively, the interpretation registrant may submit his/her own language certification data to an administrator of the server device 20 with authentication in the language certification institution, and in this case, interpretation ability information in the data D2 is set based on the submitted language certification data.

The language certification data is merely an example of the interpretation level estimation information. The interpretation level estimation information is arbitrary as long as it is data for estimating a proficiency level of interpretation between the reference language and a non-reference language of each interpretation registrant for each non-reference language. For example, information (so-called word-of-mouth information from a user who uses interpretation) introduced to a network in relation to interpretation of an interpretation registrant may be included in the interpretation level estimation information. Although it is assumed that four grades of levels LV1 to LV4 are set for the interpretation level in the present embodiment, the number of grades of setting the interpretation level is arbitrary as long as the number is 2 or more.

FIG. 10 illustrates a structure of discount rate data D3 stored and retained in the server storage unit 23. In the discount rate data D3, a discount rate $k_D$ of the fare of the interpretation registrant according to the interpretation level is defined for each non-reference language. That is, in the discount rate data D3, the discount rate $k_D$ is defined for each non-reference language and for each interpretation level, and the fare of the interpretation registrant in a case where an interpretation-requiring person and the interpretation registrant actually share one taxi as the persons P and Q is $(1-k_D)$ times the reference fare. "$0<k_D\le1$" is satisfied.

A method of calculating a fare of a person of interest, who is one interpretation registrant, will be described with reference to FIG. 11. A reference fare of the person of interest is calculated in accordance with a predetermined reference fare calculation condition, based on a traveling distance and traveling time of a taxi in a state where the person of interest rides in the taxi, as well as a getting-in place, a getting-off place, a riding start time-point, a riding end time-point, and the like of the person of interest in taking the taxi. The same applies to the interpretation-requiring person. When a pre-determined fare service, which will be described later, is not introduced, the reference fare is calculated by a taxi meter or the in-vehicle device 30 mounted on the taxi. Here, it is considered that the pre-determined fare service is not introduced.

It is assumed that a reference fare of the person of interest at the time when the person of interest moves by taxi from a specific getting-in place to a specific getting-off place under a specific riding condition is a fare $F_{REF}$. Here, the specific riding condition is a riding condition excluding presence or absence of ride-sharing between the person of interest and the interpretation-requiring person, such as a traveling distance and traveling time of the taxi in a state where the person of interest rides in the taxi, and a getting-in place, a getting-off place, a riding start time-point, and a riding end time-point of the person of interest in taking the taxi. In this case, if the person of interest alone moves by taxi from the specific getting-in place to the specific getting-off place under the specific riding condition (N in step S11), the fare of the person of interest is the reference fare $F_{REF}$ (step S14). On the other hand, when the person of interest (interpretation registrant) moves under the specific riding condition from the specific getting-in place to the specific getting-off place in a state where the person of interest and an interpretation-requiring person share one taxi, and a use language of the interpretation-requiring person is included in interpretable languages of the person of interest (interpretation registrant) (Y in steps S11 and S12), the fare of the person of interest is $(1-k_D)$ times the reference fare $F_{REF}$ (step S13). Even when the person of interest (interpretation registrant) moves under the specific riding condition from the specific getting-in place to the specific getting-off place in a state where the person of interest and the interpretation-requiring person share one taxi, if the use language of the interpretation-requiring person is not included in the interpretable languages of the person of interest (interpretation registrant) (Y in step S11 and N in step S12), the fare of the person of interest is the reference fare $F_{REF}$ (step S14).

When the discount rate $k_D$ is set for the person of interest, a signal containing information specifying the set discount rate $k_D$ is transmitted from the server device 20 (the server communication unit 22) to the in-vehicle device 30 of the taxi that the person of interest and the interpretation-requiring person should share. The information for specifying the discount rate $k_D$ is provided from the in-vehicle device 30 of the taxi to a taxi meter thereof, so that the fare of the person of interest is actually set to "$F_{REF} \times (1-k_D)$". The in-vehicle device 30 may function as a taxi meter.

When the non-reference language to be interpreted is constant, the discount rate $k_D$ increases correspondingly as the interpretation level increases. The fare of the interpretation registrant for whom the discount rate $k_D$ is set decreases as the discount rate $k_D$ increases. That is, for example, in a case where a use language of the person P serving as the interpretation-requiring person is Chinese and Chinese is included in the interpretable language of the person Q serving as the interpretation registrant, when interpretation levels of Chinese of the person Q are levels LV1, LV2, LV3, and LV4, the discount rates $k_D$ for the person Q are set to 70%, 60%, 50%, and 30%, respectively as illustrated in FIG. 10. Similarly, for example, in a case where the use language of the person P serving as the interpretation-requiring person is Swahili and Swahili is included in the interpretable language of the person Q serving as the interpretation registrant, when interpretation levels of Swahili of the person Q are levels LV1, LV2, LV3, and LV4, the discount rates $k_D$ for the person Q are set to 100%, 90%, 80%, and 60%, respectively. When "$k_D=1$", that is, when the discount rate $k_D$ is set to 1, the fare of the person Q is zero. However, the discount rate data D3 may be configured so that there is no "$k_D=1$".

Figure 12:
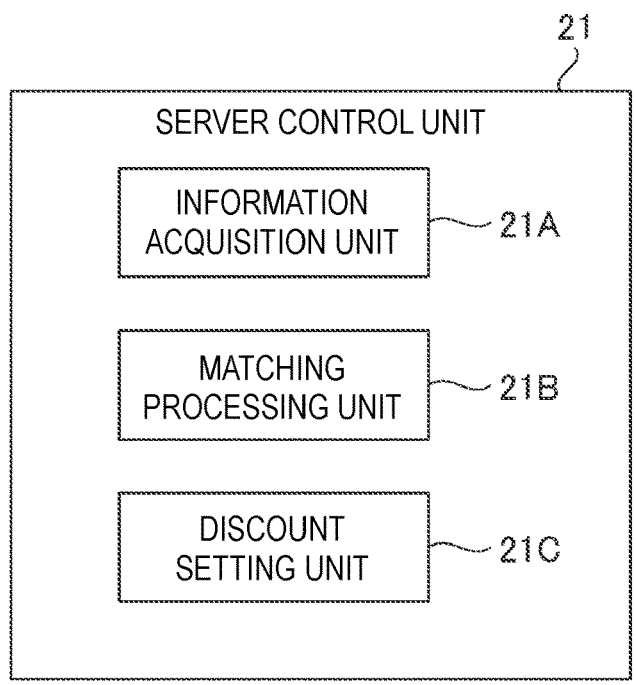
FIG. 12 is a functional block diagram of a server control unit related to the special vehicle dispatch service according to the embodiment of the present invention.

FIG. 12 is a functional block diagram of the server control unit 21 related to the special vehicle dispatch service. The server control unit 21 includes an information acquisition unit 21A, a matching processing unit 21B, and a discount setting unit 21C. The information acquisition unit 21A acquires interpretation-requiring person information (first information) on an interpretation-requiring person and interpretation registrant information (second information) on an interpretation registrant. The interpretation-requiring person information includes at least information specifying a use language of the interpretation-requiring person. The interpretation registrant information includes at least information specifying an interpretable language of the interpretation registrant, and preferably includes interpretation ability information of the interpretation registrant (see FIGS. 7 and 8). The matching processing unit 21B performs matching processing for an interpretation-requiring person and an interpretation registrant who should share a ride (details will be described later). The discount setting unit 21C performs discount setting of a fare of an interpretation registrant at the time when an interpretation-requiring person and the interpretation registrant share one taxi, based on the interpretation-requiring person information and the interpretation registrant information. The discount setting of a fare of an interpretation registrant includes setting of provision or non-provision of a discount for the fare of the interpretation registrant and setting of the discount rate $k_D$ at the time when a discount is to be provided.

Hereinafter, specific operation examples, application techniques, modification techniques, and the like related to the taxi operation system SYS will be described among a plurality of embodiments. The matters described above in the present embodiment are applied to the following examples unless otherwise specified and unless contradictory. When there is a matter, in the examples, contradictory to the matters described above, the description in the examples may be given priority. In addition, as long as there is no contradiction, matters described in an arbitrary example among the plurality of examples described below can be applied to another arbitrary example (that is, two or more examples among the plurality of examples can be combined arbitrarily).

First Example

The first example of the taxi operation system SYS will be described. In the first example, an operation of matching an interpretation-requiring person and an interpretation registrant in real time and promoting ride-sharing of the matched interpretation-requiring person and the interpretation registrant will be described.

Figure 13:
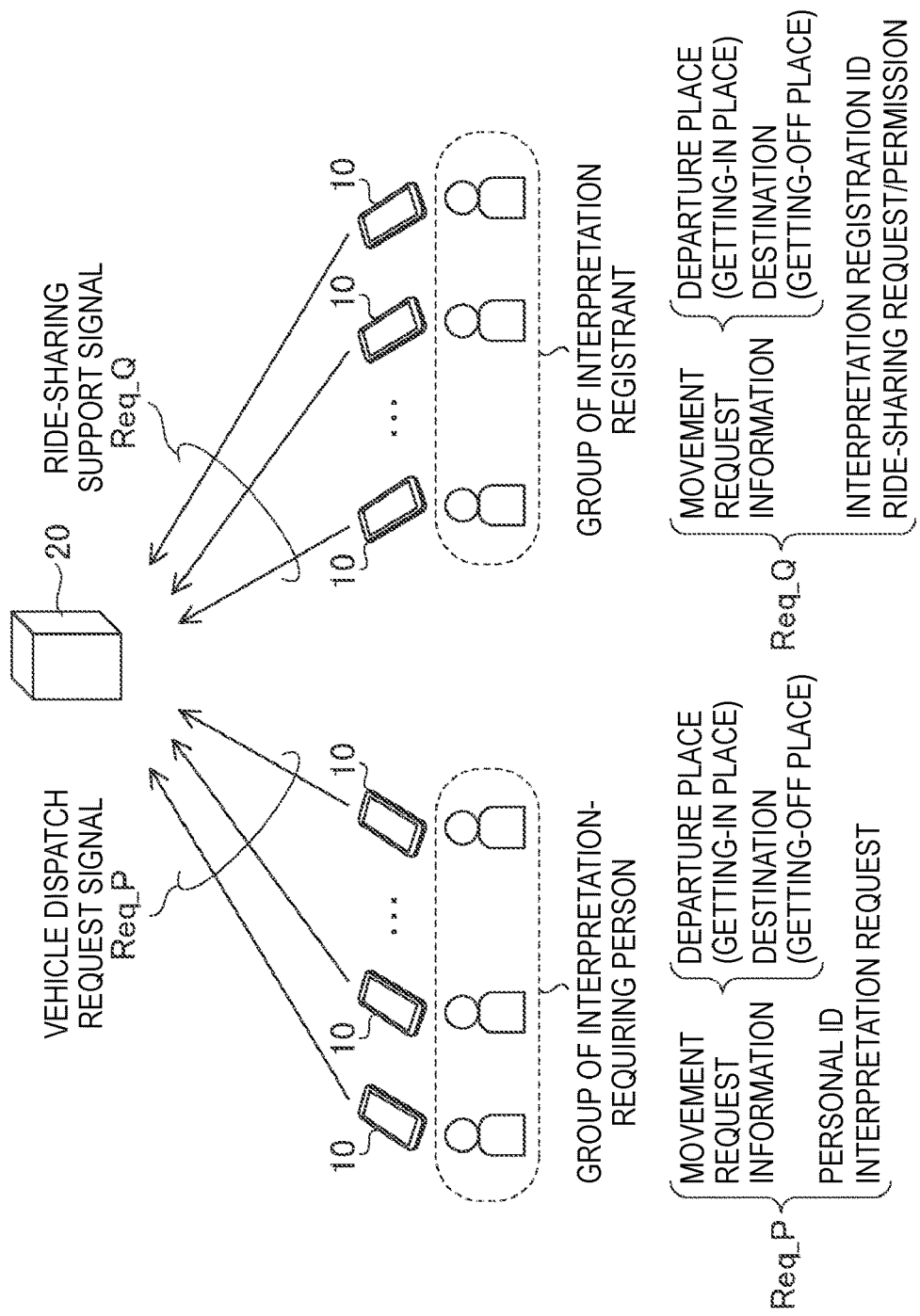
FIG. 13 is a diagram illustrating a state where a vehicle dispatch request signal and a ride-sharing support signal are transmitted from a terminal device of each interpretation-requiring person and a terminal device of each interpretation registrant to a server device according to a first example belonging to the embodiment of the present invention.

Reference is made to FIG. 13. A vehicle dispatch request signal Req_P is transmitted to the server device 20 from each of a plurality of terminal devices 10 possessed by a plurality of interpretation-requiring persons, and a ride-sharing support signal Req_Q is transmitted to the server device 20 from each of a plurality of terminal devices 10 possessed by a plurality of interpretation registrants. FIG. 13 illustrates a state where a plurality of vehicle dispatch request signals Req_P corresponding to the plurality of interpretation-requiring persons and a plurality of ride-sharing support signals Req_Q corresponding to the plurality of interpretation registrants are transmitted to the server device 20 at the same time. For example, in a case where persons of various nationalities move from an international event venue after an event ends at the venue (for example, after a game in an international meeting venue of sports ends), it is assumed that a large number of signals Req_P and Req_Q are transmitted to the server device 20 at the same time.

The vehicle dispatch request signal Req_P corresponding to a specific interpretation-requiring person includes movement request information and a personal ID (see FIG. 6) of the specific interpretation-requiring person, and includes information indicating that interpretation is requested. The movement request information of the interpretation-requiring person includes a departure place and a destination of the interpretation-requiring person in taking a taxi. The movement request information of the interpretation-requiring person may further include a transit point, a desired departure time-point, a desired arrival time-point, and the like.

The ride-sharing support signal Req_Q corresponding to a specific interpretation registrant includes movement request information and an interpretation registrant ID (see FIG. 7) of the specific interpretation registrant, and includes information indicating that ride-sharing with an interpretation-requiring person is requested or permitted. The movement request information of the interpretation registrant includes a departure place and a destination of the interpretation registrant in taking a taxi. The movement request information of the interpretation registrant may further include a transit point, a desired departure time-point, a desired arrival time-point, and the like of the interpretation registrant in taking a taxi.

When an interpretation-requiring person or an interpretation registrant gets into a taxi and moves, the interpretation-requiring person or the interpretation registrant is a passenger for the taxi. The departure place is a departure point of movement of the passenger in taking the taxi, and is a point where the passenger gets into the taxi (a point where the passenger starts riding in the taxi). Therefore, the departure place and the getting-in place are synonymous with each other with respect to using a taxi. The destination is a target point at which the passenger wants to arrive by using the taxi, and is also a point at which the passenger gets off the taxi. Therefore, the destination and the getting-off place are synonymous with each other with respect to using a taxi.

A flow of matching between an interpretation-requiring person and an interpretation registrant will be described with reference to FIG. 14. Matching refers to selecting a combination of an interpretation-requiring person and an interpretation registrant who should share one taxi. Processing of steps S31 to S33 is executed by the server device 20. Although a state is illustrated in the example of FIG. 13 where a plurality of vehicle dispatch request signals Req_P from a plurality of terminal devices 10 and a plurality of ride-sharing support signals Req_Q from a plurality of terminal devices 10 are received by the server device 20, the number of the vehicle dispatch request signals Req_P to be received by the server device 20 is arbitrary as long as the number is 1 or more, and the number of the ride-sharing support signals Req_Q to be received by the server device 20 is arbitrary as long as the number is 1 or more.

First, in step S31, one or more vehicle dispatch request signals Req_P from terminal devices 10 of one or more interpretation-requiring persons are received by the server device 20 (server communication unit 22). In step S31, based on a reception result, the information acquisition unit 21A (see FIG. 12) acquires movement request information and unique information of each interpretation-requiring person as the interpretation-requiring person information (first information) on each interpretation-requiring person. The information acquisition unit 21A can refer to the vehicle dispatch application registrant data D1 (see FIG. 6), and acquire the unique information of each interpretation-requiring person from the data D1 based on a personal ID included in each vehicle dispatch request signal Req_P.

Meanwhile, in step S32, one or more ride-sharing support signals Req_Q from terminal devices 10 of one or more interpretation registrants are received by the server device 20 (server communication unit 22). In step S32, based on a reception result, the information acquisition unit 21A acquires movement request information and unique information of each interpretation registrant as the interpretation registrant information (second information) on each interpretation registrant. The information acquisition unit 21A can refer to the interpretation registrant data D2 (see FIG. 7), and acquire the unique information of each interpretation registrant from the data D2 based on an interpretation registrant ID included in each ride-sharing support signal Req_Q.

Note that an execution order of the processing of steps S31 and S32 is arbitrary, and the processing of both steps may be performed at the same time. A part (for example, information specifying a use language) or the whole of the unique information of an interpretation-requiring person may be included in the vehicle dispatch request signal Req_P, and in this case, the information acquisition unit 21A may extract the part (for example, the information specifying a use language) or the whole of the unique information of the interpretation-requiring person from the vehicle dispatch request signal Req_P.

Following the steps S31 and S32, in step S33, matching processing is performed by the matching processing unit 21B (see FIG. 12). In the matching processing, an interpretation-requiring person and an interpretation registrant who should share one taxi are selected as ride-sharing subjects based on matching information including the information acquired in steps S31 and S32. The interpretation-requiring person and the interpretation registrant who are selected here correspond to the persons P and Q in FIG. 5 respectively. That is, in the matching processing, based on the matching information, the person P who is an interpretation-requiring person is selected and a user (interpretation registrant) who can interpret between the reference language and a use language of the person P is selected as the person Q, from a plurality of users including one or more interpretation registrants. At this time, an interpretation-requiring person and an interpretation registrant whose departure places completely or to some extent coincide with each other and whose destinations also completely or to some extent coincide with each other are selected as ride-sharing subjects (P and Q). Since the matching information includes the information acquired in steps S31 and S32, that is, the interpretation-requiring person information (movement request information and unique information) of each interpretation-requiring person and the interpretation registrant information (movement request information and unique information) of each interpretation registrant, the matching information includes a departure place and a destination of each user in taking a taxi, a use language of each user, and interpretation ability information of each interpretation registrant (see FIGS. 6 and 7 as appropriate). Therefore, it is possible to select appropriate ride-sharing subjects.

That is, it is possible to appropriately match, as ride-sharing subjects, a user (interpretation-requiring person) who requests interpretation with a user (interpretation registrant) who is able to perform interpretation, whose departure places and destinations completely or to some extent coincide with each other.

At this time, by including attribute information of each user (attribute information in addition to the use language; see FIGS. 6 and 7) in the matching information, it is possible to match ride-sharing subjects from various angles, and optimization of matching is promoted. For example, it is possible to make it easier to match users of the same gender than to match users of different genders, or to match users whose hobbies coincide with each other. Attribute information of an interpretation registrant may include knowledge amount information about a tourist resort. For example, an application is possible in which when an interpretation-requiring person as the person P is to move by taxi in Kyoto City, an interpretation registrant having abundant knowledge about Kyoto is easily selected as the person Q.

Figure 15:
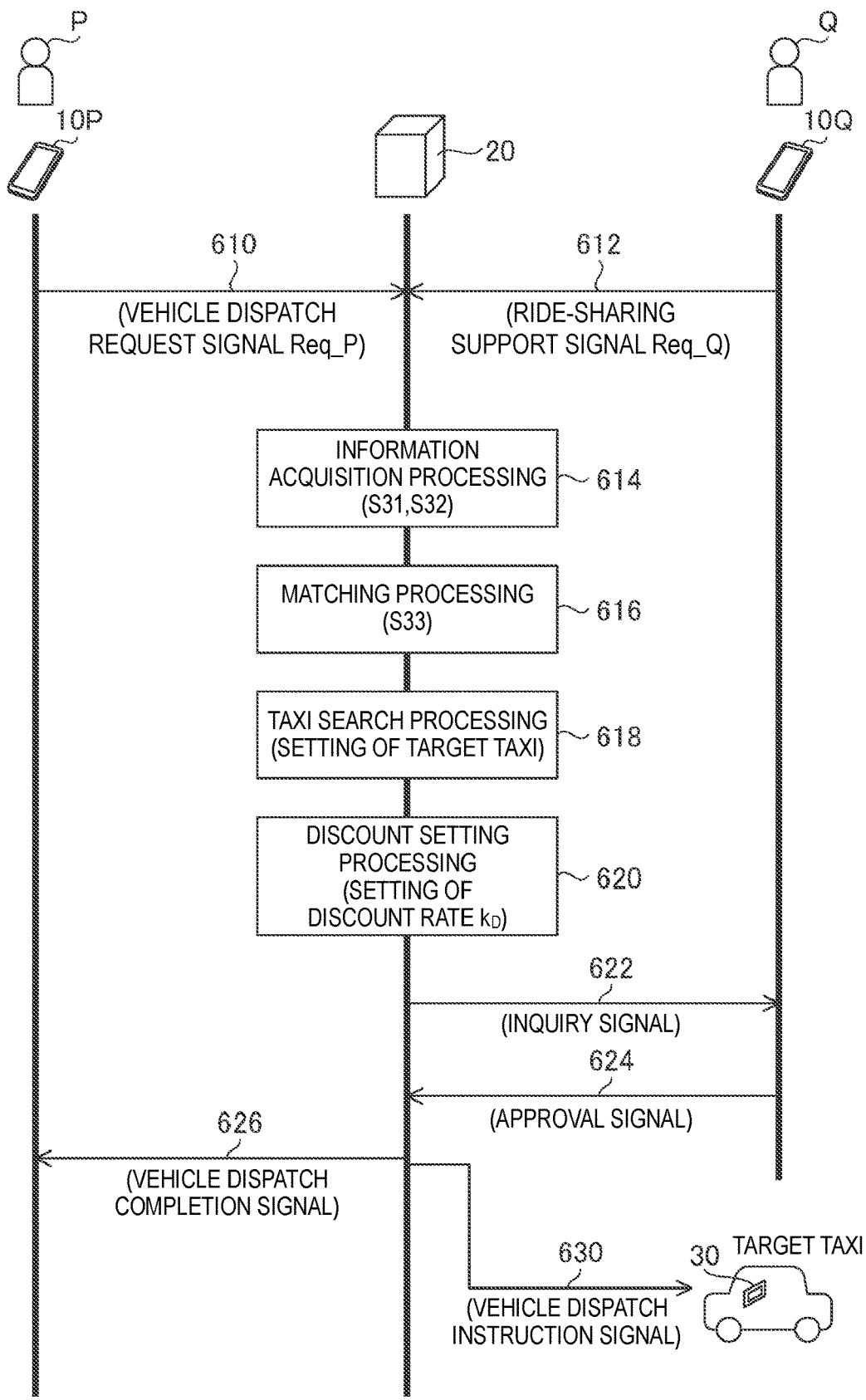
FIG. 15 is an illustrative diagram of a special vehicle dispatch service focusing on one interpretation-requiring person and one interpretation registrant according to the first example belonging to the embodiment of the present invention.

FIG. 15 illustrates a flow of operations of the taxi operation system SYS focusing on the person P who is one interpretation-requiring person and the person Q who is one interpretation registrant. The persons P and Q in FIG. 15 indicate the same persons as the persons P and Q in FIG. 5. In FIG. 15, in order to prevent complication of the illustration, only persons P and Q selected as a pair of ride-sharing subjects by the matching processing among the plurality of interpretation-requiring persons and the plurality of interpretation registrants illustrated in FIG. 12 are illustrated. The terminal devices 10 possessed by the persons P and Q are particularly referred to by reference signs "10P" and "10Q", respectively.

A signal 610 is a vehicle dispatch request signal Req_P transmitted from the terminal device 10P to the server device 20, and a signal 612 is a ride-sharing support signal Req_Q transmitted from the terminal device 10Q to the server device 20. In the server device 20, after information acquisition processing 614 based on reception results of the signals 610 and 612 is executed, matching processing 616 and taxi search processing 618 are executed. The information acquisition processing 614 corresponds to the processing of steps S31 and S32 in FIG. 14, and the matching processing 616 corresponds to the processing of step S33 in FIG. 14. As a result of the matching processing 616, the persons P and Q are selected as ride-sharing subjects.

Each in-vehicle device 30 of the plurality of taxies belonging to the taxi operation system SYS sequentially transmits sequentially acquired vehicle location information to the server device 20. In the taxi search processing 618, the server control unit 21 searches for a taxi suitable for ride-sharing of the persons P and Q, based on the vehicle location information from each in-vehicle device 30 and the signals 610 and 612 (particularly, departure places of the persons P and Q), and sets a searched taxi as a target taxi. At this time, only a taxi in an empty state may be included in search targets. Since searching itself is an existing technique, a detailed description thereof will be omitted. The matching processing 616 and the taxi search processing 618 may be performed in parallel so that a matching result and a taxi search result are optimized.

When the persons P and Q are selected as ride-sharing subjects by the matching processing 616, discount setting processing 620 is executed by the discount setting unit 21C (see FIG. 12). In the discount setting processing 620, the discount setting unit 21C sets a discount rate $k_D$ for the person Q based on a use language of the person P and interpretation ability information of the person Q. The method of setting the discount rate $k_D$ is as described above with reference to FIG. 10 and the like. That is, for example, when the use language of the person P is Chinese and interpretation levels of Chinese of the person Q are levels LV1, LV2, LV3, and LV4, the discount rates $k_D$ for the person Q are set to 70%, 60%, 50%, and 30%, respectively. Similarly, for example, when the use language of the person P is Swahili and interpretation levels of Swahili of the person Q are levels LV1, LV2, LV3, and LV4, the discount rates $k_D$ for the person Q are set to 100%, 90%, 80%, and 60%, respectively.

After the discount setting processing 620, the server control unit 21 transmits an inquiry signal 622 to the terminal device 10Q by using the server communication unit 22. Content of the inquiry signal 622 includes an appointment of the person P to share a ride with the person Q, the use language of the person P, and the discount rate $k_D$ set in the discount setting processing 620. In addition, the inquiry signal 622 also includes information indicating when and where the person Q should come in order to get into the target taxi (for example, information such as "Please come to XX at 16:55 today"), and information indicating that an identity verification document is required for application of a discount (for example, information such as "a driving license is required for identity verification in order to receive a discount"). Furthermore, attribute information (nationality, gender, and the like) of the person P, in addition to the use language of the person P, may also be included in the inquiry signal 622. The content included in the inquiry signal 622 is transmitted to the person Q through the interface unit 14 of the terminal device 10Q by a vehicle dispatch application executed by the terminal device 10Q.

When the person Q refers to the content included in the inquiry signal 622 and then inputs an approval operation intended to approve ride-sharing to the interface unit 14 of the terminal device 10Q, an approval signal 624 is generated under the control of the vehicle dispatch application executed by the terminal device 10Q, and the approval signal 624 is transmitted from the terminal device 10Q to the server device 20. When the approval is not performed, the ride-sharing subject is reselected by executing the matching processing 616 again, and a detailed description thereof is omitted.

When the approval signal 624 is received by the server device 20, the server control unit 21 transmits a vehicle dispatch completion signal 626 to the terminal device 10P, and transmits a vehicle dispatch instruction signal 630 to the in-vehicle device 30 of the target taxi set in the taxi search processing 618. The vehicle dispatch completion signal 626 is a signal indicating that dispatch of a taxi is completed based on the signal 610 and the taxi is heading for a departure place designated by the person P or the taxi is already waiting at the departure place designated by the person P, that arrangement of an interpreter is completed and the person able to perform interpretation shares the ride, and the like. The person P confirms content of the vehicle dispatch completion signal 626 at the interface unit 14 of the terminal device 10P, and heads for the departure place of the person P in taking the taxi (or waits for arrival of the taxi at the departure place when already being at the departure place).

The vehicle dispatch instruction signal 630 is a signal transmitted from the server communication unit 22 to the in-vehicle device 30 of the target taxi under the control of the server control unit 21, and is a signal instructing dispatch of the taxi. Content of the signal 630 includes a passenger pick-up place where the target taxi should go to pick up the passenger (corresponding to the departure place of the persons P and Q), a fact that the persons P and Q share a ride, the discount rate $k_D$ for the person Q set in the discount setting processing 620, an identity verification method for the person Q (for example, presentation of a driving license), and the like. In the target taxi, the content of the signal 630 is transmitted to the driver through the interface unit 34 (for example, displayed on a display screen of the interface unit 34). The driver of the target taxi confirms the content of the signal 630 and heads for the passenger pick-up place.

In the target taxi, when the person P is to get off the taxi after the persons P and Q ride in the taxi in a shared manner, the person P is charged a reference fare. The reference fare of the person P is calculated in accordance with a predetermined reference fare calculation condition, based on a traveling distance and traveling time of the taxi in a state where the person P rides in the taxi, and the getting-in place, a getting-off place, a riding start time-point, a riding end time-point, and the like of the person P in taking the taxi. On the other hand, in the target taxi, when the person Q is to get off the taxi after the persons P and Q ride in the taxi in a shared manner, the person Q is charged a fare determined after discount application at the discount rate $k_D$. However, if the fare determined after discount application is zero, the person Q is not charged the fare. The fare determined after discount application is $(1-k_D)$ times the reference fare calculated for the person Q.

Second Example

The second example of the taxi operation system SYS will be described. In the first example, a case where an interpretation-requiring person and an interpretation registrant are matched mainly in real time (hereinafter, referred to as a real-time case) is assumed. That is, for example, in a situation where persons of various nationalities move from an international event venue after an event ends at the venue (for example, after a game in an international meeting venue of sports ends), a taxi is currently used as a moving means for immediately moving a large number of persons in the vicinity of the venue from the venue. Such a case corresponds to the real-time case. However, the above-described special vehicle dispatch service in the taxi operation system SYS can also be applied to reserved vehicle dispatch.

In the second example, a case where the special vehicle dispatch service is applied to the reserved vehicle dispatch (hereinafter, referred to as a reserved vehicle dispatch case) is assumed. The reserved vehicle dispatch is a service for dispatching a taxi after setting an arbitrary future date and time as a departure date and time. In the reserved vehicle dispatch case, basically, operations similar to those in the first example are performed, and the matters described in the first example are also applied to the reserved vehicle dispatch case of the second example unless otherwise specified.

However, in the reserved vehicle dispatch case, a desired departure date and time is included in movement request information of each vehicle dispatch request signal Req_P, and a desired departure date and time or a possible departure date and time is included in movement request information of each ride-sharing support signal Req_Q. The desired departure date and time and the possible departure date and time are, of course, future dates and times as viewed from transmission dates and times of the signals Req_P and Req_Q.

When focusing on one person P, a desired departure date and time in the vehicle dispatch request signal Req_P is a date and time at which the person P desires to start moving by taxi. When focusing on one person Q, a desired departure date and time in the ride-sharing support signal Req_Q is a date and time at which the person Q desires to start moving by a taxi. The possible departure date and time in the ride-sharing support signal Req_Q represents a date and time admitted by the person Q as a movement start date and time of the person Q in taking a taxi, and may have a corresponding time width. For example, a time period from 10:00 a.m. to 11:30 a.m. on Apr. 5, 2020 may be set as the possible departure date and time. This indicates that the person Q thinks it is fine to meet convenience of a ride-sharing partner as long as departure is possible within the time period. The person Q who desires a fare to be reduced or zero may be considered to be able to give way about time to some extent. Therefore, in consideration of its own convenience, the person Q includes the desired departure date and time or the possible departure date and time in the movement request information of the ride-sharing support signal Req_Q.

Although the vehicle dispatch request signal Req_P is described by focusing on the person P who is one interpretation-requiring person, the same applies to the vehicle dispatch request signal Req_P corresponding to an arbitrary interpretation-requiring person. Although the ride-sharing support signal Req_Q is described by focusing on the person Q who is one interpretation registrant, the same applies to the ride-sharing support signal Req_Q corresponding to an arbitrary interpretation registrant.

Figure 14:
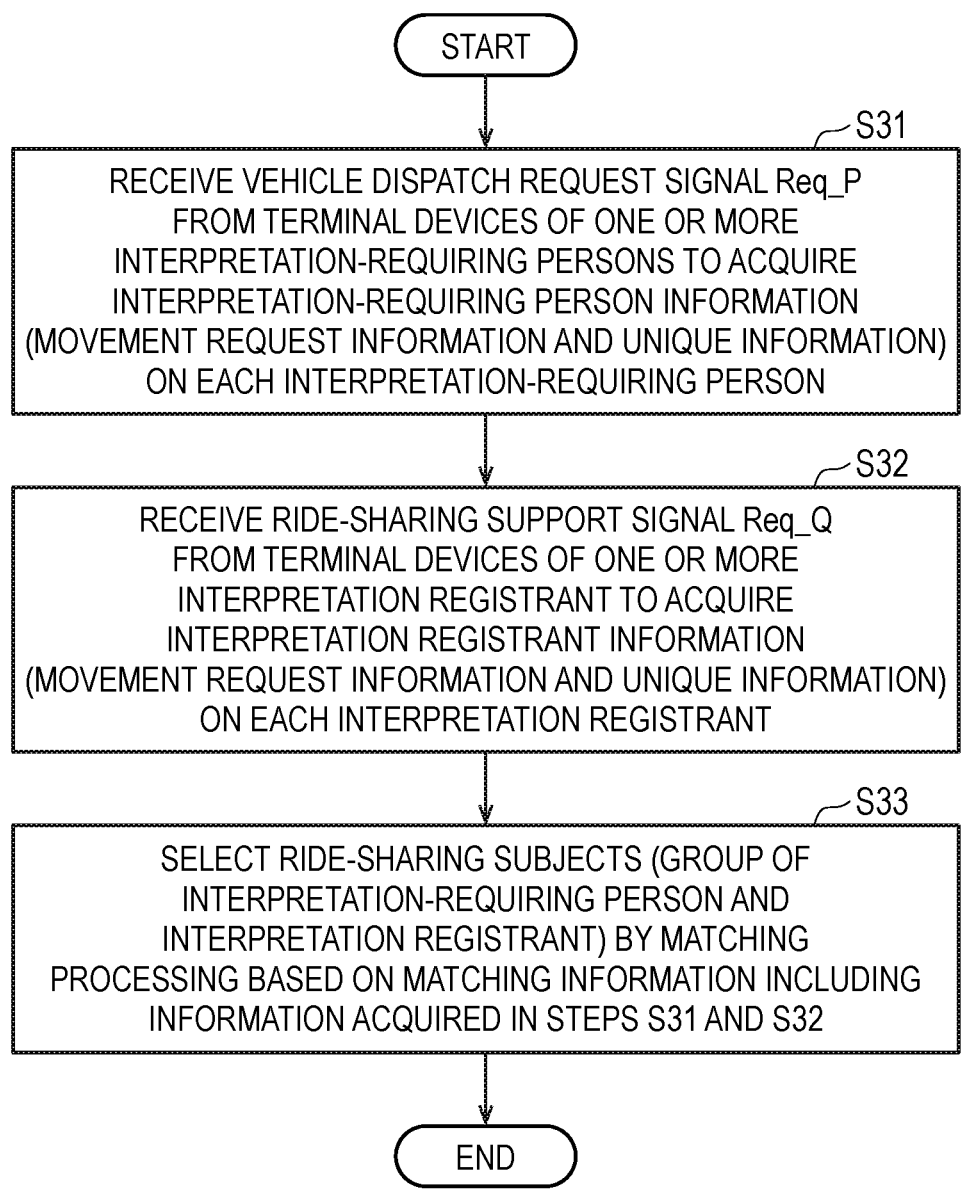
FIG. 14 is a flowchart illustrating a flow of operations for selecting ride-sharing subjects for a taxi according to the first example belonging to the embodiment of the present invention.

Also in the reserved vehicle dispatch case, a flow of matching is as illustrated in FIG. 14, and ride-sharing subjects are selected through the processing of steps S31 to S33. However, in the reserved vehicle dispatch case, the desired departure date and time in each signal Req_P and the desired departure date and time or the possible departure date and time in each signal Req_Q are added to matching information, and matching according to desires of the interpretation-requiring person and the interpretation registrant regarding the departure date and time is performed. As a result, it is possible to appropriately match, as ride-sharing subjects, a user (interpretation-requiring person) who desires interpretation and a user (interpretation registrant) who is able to perform interpretation, whose departure places and destinations are completely or to some extent coincide with each other and whose desires regarding departure date and time are completely or to some extent coincide with each other.

Figure 16:
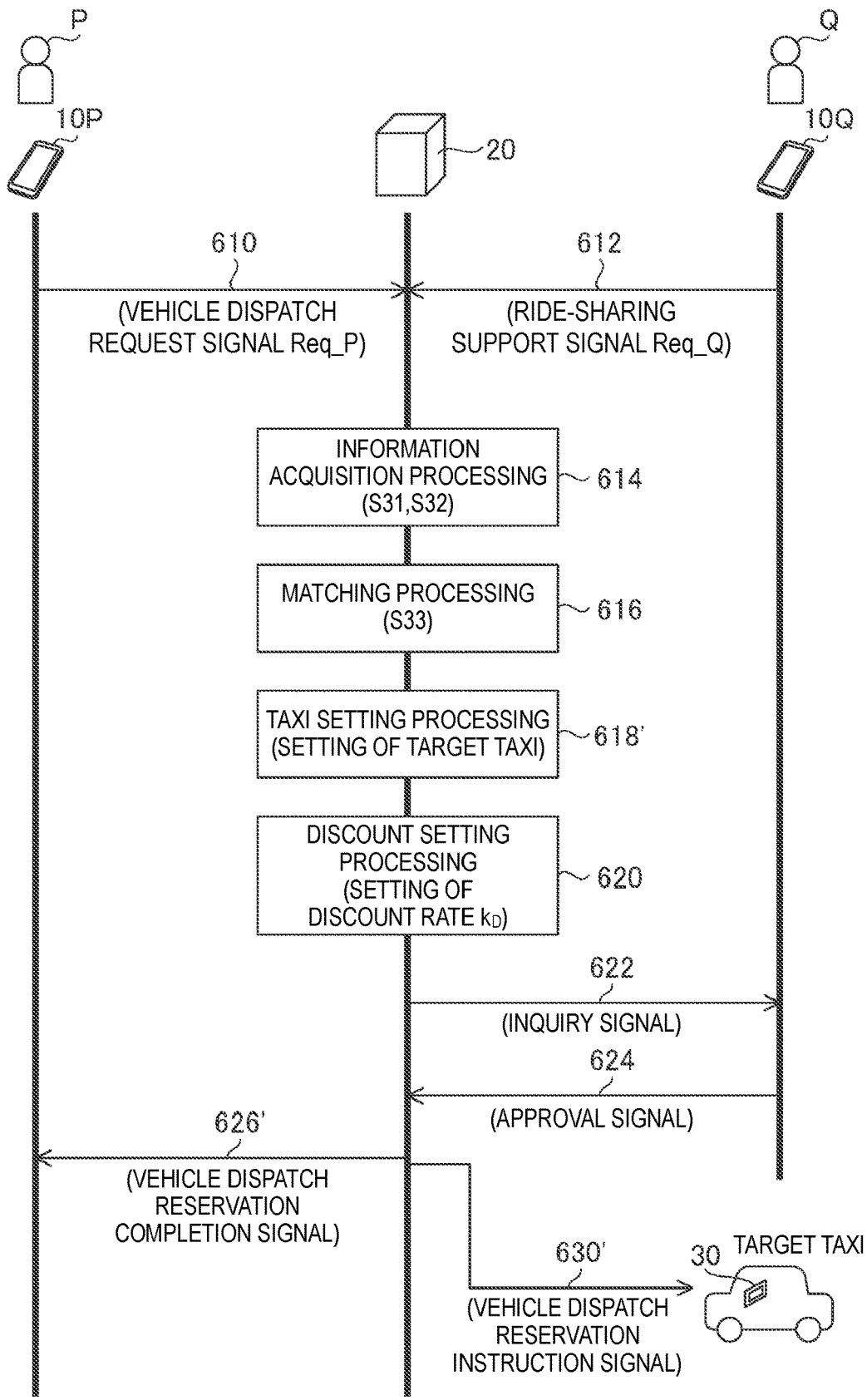
FIG. 16 is an illustrative diagram of a special vehicle dispatch service focusing on one interpretation-requiring person and one interpretation registrant according to a second example belonging to the embodiment of the present invention.

Although a flow of operations of the taxi operation system SYS focusing on the person P who is one interpretation-requiring person and the person Q who is one interpretation registrant is also similar to that described in the first example with reference to FIG. 15, some modifications are made to FIG. 15 and a result is as illustrated in FIG. 16. The operations of the taxi operation system SYS in the reserved vehicle dispatch case will be described mainly focusing on different parts between FIG. 15 and FIG. 16 (that is, different parts between the real-time case and the reserved vehicle dispatch case).

The transmission and reception of the signals 610 and 612, the information acquisition processing 614 based on the signals 610 and 612, and the matching processing 616 are as described in the first example. However, the content of the signal 610 that is the vehicle dispatch request signal Req_P from the terminal device 10P includes a desired departure date and time of the person P, and the content of the signal 612 that is the ride-sharing support signal Req_Q from the terminal device 10Q includes a desired departure date and time or a possible departure date and time of the person Q.

In the reserved vehicle dispatch case, taxi setting processing 618' is executed instead of the taxi search processing 618. In the taxi setting processing 618', one arbitrary taxi belonging to the taxi operation system SYS may be set as a target taxi. However, a taxi that is not desired to be set as the target taxi, such as a taxi that is expected to be in an occupied state at the time of the desired departure date and time in the signal 610, is excluded from setting targets of the target taxi.

In the reserved vehicle dispatch case, after the approval signal 624 is received by the server device 20, a vehicle dispatch reservation completion signal 626' is transmitted from the server device 20 to the terminal device 10P instead of the vehicle dispatch completion signal 626. The vehicle dispatch reservation completion signal 626' is a signal indicating that a vehicle dispatch reservation for a taxi is completed based on the signal 610, that arrangement of an interpreter is completed and the person able to perform interpretation shares the ride, and the like. The person P confirms content of the vehicle dispatch reservation completion signal 626' at the interface unit 14 of the terminal device 10P, and goes to the departure place designated by himself/ herself at an appropriate time on the day of riding.

Further, in the reserved vehicle dispatch case, after the approval signal 624 is received by the server device 20, a vehicle dispatch reservation instruction signal 630' is transmitted from the server device 20 to the in-vehicle device 30 instead of the vehicle dispatch instruction signal 630. The vehicle dispatch reservation instruction signal 630' is a signal representing a vehicle dispatch reservation for a taxi, and includes, as content of the signal 630', a passenger pick-up place (corresponding to the departure place of the persons P and Q) where the target taxi should go to pick up the passenger and a passenger pick-up date and time at which the target taxi should pick up the passenger, a fact that the persons P and Q share a ride, the discount rate $k_D$ for the person Q set in the discount setting processing 620, an identity verification method for the person Q (for example, presentation of a driving license), and the like. The passenger pick-up date and time coincides with the desired departure date and time of the person P designated in the signal 610. In the target taxi, the content of the signal 630' is transmitted to the driver through the interface unit 34 (for example, displayed on a display screen of the interface unit 34), and the driver of the target taxi confirms the content of the signal 630' and heads for the passenger pick-up place in a timely manner.

When a transmission and reception date (for example, Apr. 3, 2020) of the signals 610 and 612 is before a date (for example, Apr. 5, 2020) of the desired departure date and time of the person P, the setting of the target taxi and the transmission of the vehicle dispatch reservation instruction signal 630' may be executed on the day (for example, Apr. 5, 2020) of riding of the persons P and Q, and the target taxi may be dynamically set according to an operation state of each taxi on the day.

The fares that the persons P and Q are to be charged are as described in the first example. However, a predetermined reservation fee may be added to the fare the person P is to be charged, and in addition, a predetermined reservation fee may be added to the fare the person Q is to be charged. Among the fare the person P is to be charged and the fare the person Q is to be charged, the reservation fee may be added only to the fare the person P is to be charged.

Third Example

The third example of the taxi operation system SYS will be described. When the server device 20 receives the vehicle dispatch request signal Req_P, an invitation of ride-sharing may be send to each interpretation registrant from the server device 20. For example, when the vehicle dispatch request signal Req_P is received from the terminal device 10 of the person P, the server control unit 21 may transmit an invitation signal including movement request information of the person P and a part (including at least a use language) or the whole of unique information of the person P to the terminal device 10 of each interpretation registrant. At this time, it is expected that some interpretation registrants who confirm on their own terminal devices 10 information included in the invitation signal transmit from their own terminal devices 10 the ride-sharing support signal Req_Q having a condition in accordance with content of the vehicle dispatch request signal Req_P.

Such an invitation is considered to be particularly useful in the reserved vehicle dispatch case according to the second example, and can also be useful in the real-time case according to the first example.

Fourth Example

The fourth example of the taxi operation system SYS will be described. Although a method of setting a discount rate in order to make a fare of an interpretation registrant who shares a ride with an interpretation-requiring person lower than a reference fare has been described above, a discount fee may be set instead of the discount rate. This will be described as the fourth example.

Figures 17, 18:
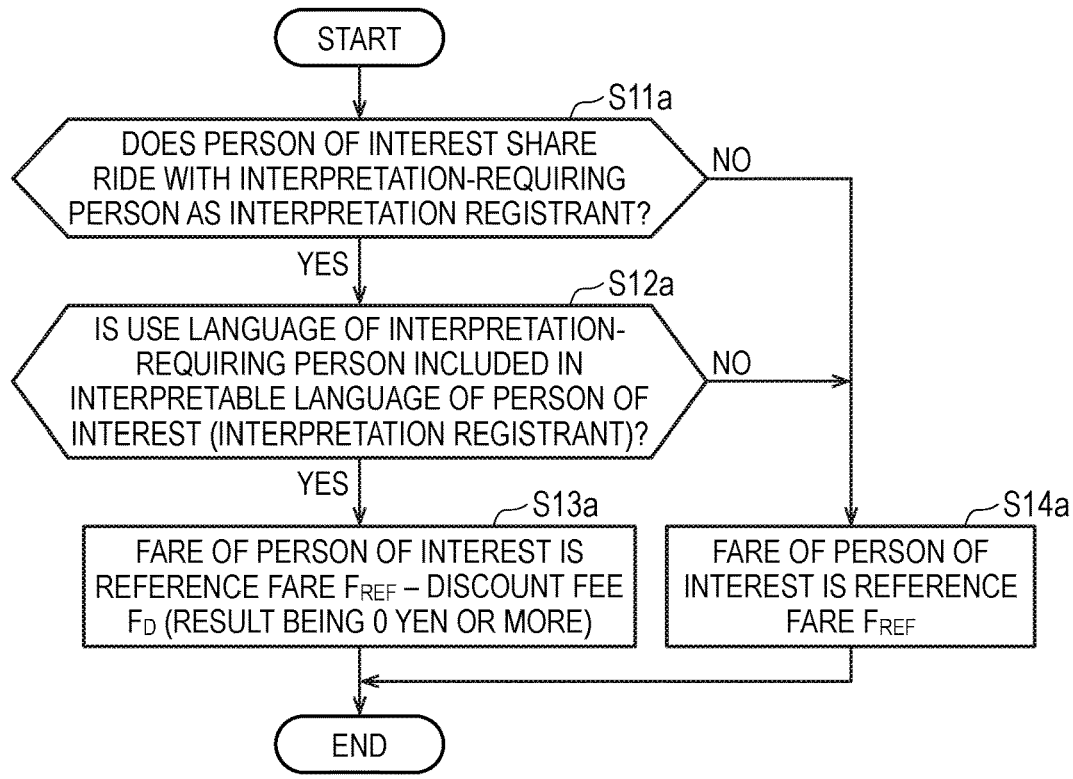
FIG. 17 is a configuration diagram of discount fee data set in the server device according to a fourth example belonging to the embodiment of the present invention.
FIG. 18 is a flowchart illustrating a method of calculating a fare of a person of interest who is one interpretation registrant according to the fourth example belonging to the embodiment of the present invention.

FIG. 17 shows a structure of discount fee data D3a according to the fourth example. In the fourth embodiment, discount fee data D3a is stored and retained in the server storage unit 23 instead of the discount rate data D3 of FIG. 10. In the discount fee data D3a, a discount fee $F_D$ of a fare of an interpretation registrant according to an interpretation level is defined for each non-reference language. That is, a fare of an interpretation registrant in a case of where an interpretation-requiring person and the interpretation registrant share one taxi as the persons P and Q is an amount of money obtained by subtracting a discount fee $F_D$ from a reference fare, and the discount fee $F_D$ is defined for each non-reference language and for each interpretation level in the discount fee data D3a. "$0<F_D$" is satisfied.

A method of calculating a fare of a person of interest, who is one interpretation registrant, will be described with reference to FIG. 18. It is assumed that a reference fare of the person of interest at the time when the person of interest moves by taxi from a specific getting-in place to a specific getting-off place under a specific riding condition is a fare $F_{REF}$. Here, the specific riding condition is a riding condition excluding presence or absence of ride-sharing between the person of interest and an interpretation-requiring person, and is a condition such as a traveling distance and traveling time of a taxi in a state where the person of interest rides in the taxi, and a getting-in place, a getting-off place, a riding start time-point, and a riding end time-point of the person of interest in taking the taxi. In this case, if the person of interest alone moves by taxi from the specific getting-in place to the specific getting-off place under the specific riding condition (N in step S11a), the fare of the person of interest is the reference fare $F_{REF}$ (step S14a). On the other hand, when the person of interest (interpretation registrant) moves under the specific riding condition from the specific getting-in place to the specific getting-off place in a state where the person of interest and an interpretation-requiring person share one taxi, and a use language of the interpretation-requiring person is included in an interpretable language of the person of interest (interpretation registrant) (Yin steps S11a and S12a), the fare of the person of interest is set to a larger one of an amount ($F_{REF}$–$F_D$) and zero, that is, when "$F_{REF}$–$F_D$>0", the fare of the person of interest is set to the amount ($F_{REF}$–$F_D$), and when "$F_{REF}$–$F_D$×0", the fare of the person of interest is set to zero (free) (step S13a). Even when the person of interest (interpretation registrant) moves under the specific riding condition from the specific getting-in place to the specific getting-off place in a state where the person of interest and the interpretation-requiring person share one taxi, if the use language of the interpretation-requiring person is not included in the interpretable language of the person of interest (interpretation registrant) (Y in step S11a and N in step S12a), the fare of the person of interest is the reference fare $F_{REF}$ (step S14a).

When the discount fee $F_D$ is set for the person of interest, a signal including information specifying the set discount fee $F_D$ is transmitted from the server device 20 to the in-vehicle device 30 of the taxi in which the person of interest and the interpretation-requiring person should share a ride. The information specifying the discount fee $F_D$ is provided from the in-vehicle device 30 of the taxi to a taxi meter thereof, so that the fare of the person of interest is actually set to the larger one of the amount ($F_{REF}$—$F_D$) and zero (step S13a). The in-vehicle device 30 may function as a taxi meter.

When a non-reference language to be interpreted is constant, the discount fee $F_D$ increases correspondingly as an interpretation level increases. The fare of the interpretation registrant for whom the discount fee $F_D$ is set decreases as the discount fee $F_D$ increases (however, the fare does not fall below zero). That is, for example, in a case where a use language of the person P serving as an interpretation-requiring person is Chinese and Chinese is included in an interpretable language of the person Q serving as an interpretation registrant, when interpretation levels of Chinese of the person Q are levels LV1, LV2, LV3, and LV4, the discount fees $F_D$ for the person Q are set to 1200 yen, 1000 yen, 800 yen and 600 yen, respectively as illustrated in FIG. 17. Similarly, for example, in a case where the use language of the person P serving as the interpretation-requiring person is Swahili and Swahili is included in the interpretable language of the person Q serving as the interpretation registrant, when interpretation levels of Swahili of the person Q are levels LV1, LV2, LV3, and LV4, the discount fees $F_D$ for the person Q are set to 2000 yen, 1800 yen, 1600 yen and 1400 yen, respectively.

When the fourth example is combined with the operations of FIG. 15 according to the first example or the operations of FIG. 16 according to the second example, a discount fee $F_D$ is set instead of a discount rate $k_D$ in the discount setting processing 620, and information on the discount fee $F_D$, instead of information on the discount rate $k_D$, is included in the inquiry signal 622 and the vehicle dispatch instruction signal 630 or the vehicle dispatch reservation instruction signal 630'. As a result, when the person Q is to get off a target taxi shared with the person P, the person Q is charged a fare determined after discount application of the discount fee $F_D$. However, if the fare determined after discount fee $F_D$ is zero, the person Q is not charged the fare. The fare determined after discount application is a larger one of an amount obtained by subtracting the discount fee $F_D$ from the reference fare calculated for the person Q and zero.

As described above, the discount setting unit 21C performs discount setting of a fare of an interpretation registrant at the time when an interpretation-requiring person and the interpretation registrant share one taxi, based on interpretation-requiring person information including information specifying a use language of the interpretation-requiring person and based on interpretation registrant information including information specifying the interpretable language of the interpretation registrant. In the fourth example, the discount setting of a fare of an interpretation registrant includes setting of provision or non-provision of a discount for the fare of the interpretation registrant and setting of the discount fee $F_D$ at the time when a discount is to be provided.

As long as a fare of an interpretation registrant who shares a ride with an interpretation-requiring person (however, limited to an interpretation registrant who can interpret between a reference language and a use language of the interpretation-requiring person) is lower than a reference fare, the method of setting a discount can be variously modified, and the discount setting may be performed using a combination of the discount rate $k_D$ and the discount fee $F_D$. A condition of discount may be adjusted according to a traveling distance of the taxi, a time period, the day of the week, or the like during ride-sharing.

Fifth Example

The fifth example of the taxi operation system SYS will be described. In Japan, it is also possible to use a pre-determined fare service. In the pre-determined fare service, before a passenger (user) actually gets into a taxi and paid running (passenger occupation) of the taxi is started, a fare for the taxi running between a departure place and a destination is calculated as a pre-determined fare based on the departure place and the destination designated by the passenger, and a planned travel route of the taxi between the departure place and the destination is set. Then, in principle, a driver who agrees on the pre-determined performs paid running (passenger occupation) on the set planned travel route, and requests the passenger to pay the pre-determined fare as an actual fare.

The pre-determined fare service and the special vehicle dispatch service may be performed in combination. Even when this combination is performed, a method of calculating fares of the persons P and Q in the special vehicle dispatch service is the same as that described above. However, when this combination is performed, the fare of each of the persons P and Q is calculated and determined as the pre-determined fare by the server control unit 21 instead of a taxi meter or the in-vehicle device 30 in the taxi, and information on the determined pre-determined fare is transmitted from the server device 20 to the in-vehicle device 30 of the taxi (target taxi in FIG. 15 or FIG. 16). Since the pre-determined fare of the person P is calculated using the same calculation method as that of calculating a reference fare of the person P, the pre-determined fare of the person P coincides with the reference fare of the person P described in the first example. When a reference fare calculated for the person Q is set as the fare $F_{REF}$, the pre-determined fare of the person Q is "$F_{REF} \times (1-k_D)$". Alternatively, if the discount fee $F_D$ of the fourth example is adopted, the pre-determined fare of the person Q is set to be a larger one of "($F_{REF}$—$F_D$)" and zero.

Sixth Example

The sixth example of the taxi operation system SYS will be described.

In a first case where only the person P gets into a taxi as a passenger, sales of the taxi are a reference fare (for example, 2000 yen) of the person P. On the other hand, in a second case where the persons P and Q share the taxi, the sales of the taxi are a sum of the reference fare (for example, 2000 yen) of the person P and a fare (for example, 400 yen) of the person Q. This means that the sales of the taxi are larger in the second case than in the first case (however, it is assumed that the fare of the person Q is not zero). Although an operation method in which a part or all of an increase in sales is distributed to an operation company of the server device 20 or the like is possible, the fare of the person P in the second case may be set to be lower than the fare (for example, 2000 yen) of the person P in the first case. At this time, the fare (for example, 2000 yen) of the person P in the first case may be set to be equal to the sum of the fare of the person P and the fare of the person Q in the second case.

When an interpretation-requiring person and one or more persons accompanying the interpretation-requiring person form a group and the group including the interpretation-requiring person rides in one taxi, group person number information indicating the number of persons constituting the group may be included in the above-described vehicle dispatch request signal Req_P (see FIG. 13). Accordingly, the group person number information is included in the above-described interpretation-requiring person information (see step S31 of FIG. 14). Note that the group does not include an interpretation registrant. In the matching processing, it is preferable to select ride-sharing subjects in consideration of the group person number information (see step S33 in FIG. 14).

An arbitrary exchange of information between an arbitrary user and the server device 20 (administrator of the server device 20) may be implemented in a mode in which the terminal device 10 is not used, and may be implemented by, for example, voice communication or facsimile communication.

Instead of the in-vehicle device 30, a handy terminal capable of displaying only character information may be installed in a taxi. In this case, the signal 630 or 630' (see FIG. 15 or FIG. 16) is transmitted to the handy terminal. The handy terminal can also be considered to be a type of in-vehicle device.

Seventh Example

Figures 19, 20:
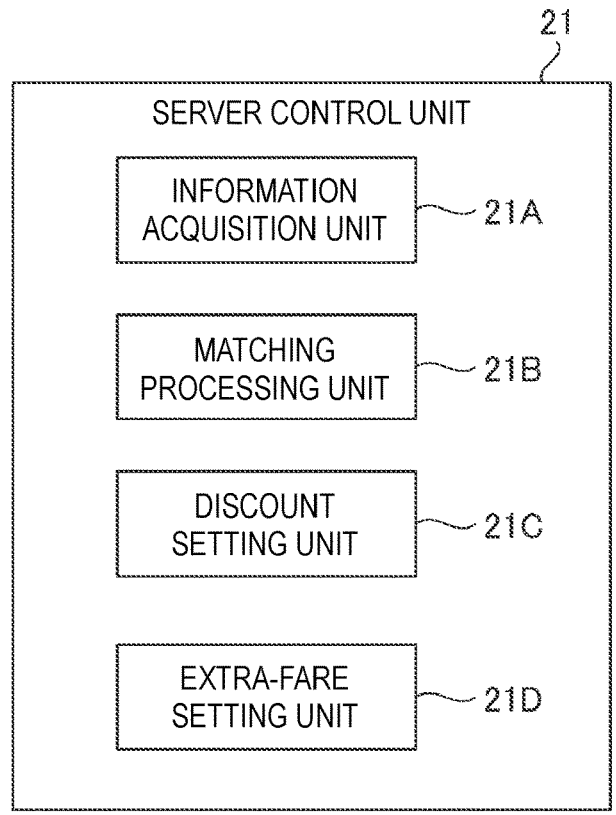
FIG. 19 is a functional block diagram of a server control unit related to a special vehicle dispatch service according to a seventh example belonging to the embodiment of the present invention.
FIG. 20 is a configuration diagram of extra-fare rate data set in the server device according to the seventh example belonging to the embodiment of the present invention.

A seventh example of the taxi operation system SYS will be described. As illustrated in FIG. 19, the server control unit 21 related to the special vehicle dispatch service may include an extra-fare setting unit 21D in addition to the information acquisition unit 21A, the matching processing unit 21B, and the discount setting unit 21C. In the seventh example, a function of the extra-fare setting unit 21D will be described. The extra-fare setting unit 21D performs an extra-fare setting for a fare of an interpretation-requiring person at the time when the interpretation-requiring person and an interpretation registrant share one taxi, based on interpretation-requiring person information and interpretation registrant information. The extra-fare setting for a fare of an interpretation-requiring person includes setting of application or non-application of an extra-fare for the fare of the interpretation-requiring person and setting of an extra-fare rate $k_U$ at the time when an extra-fare is to be applied.

FIG. 20 shows a structure of extra-fare rate data D4 referred to in the extra-fare setting. The extra-fare rate data D4 is stored and retained in the server storage unit 23. In the extra-fare rate data D4, the extra-fare rate $k_U$ of the fare of the interpretation-requiring person is defined for each non-reference language. That is, in the extra-fare rate data D4, the extra-fare rate $k_U$ is defined for each non-reference language, and the fare of the interpretation-requiring person in the case where the interpretation-requiring person and the interpretation registrant actually share one taxi as the persons P and Q is $(1+k_U)$ times a reference fare. The extra-fare rate $k_U$ at this time is determined based on which non-reference language a use language of the interpretation-requiring person is. "$0<k_U$" is satisfied.

Figure 21:
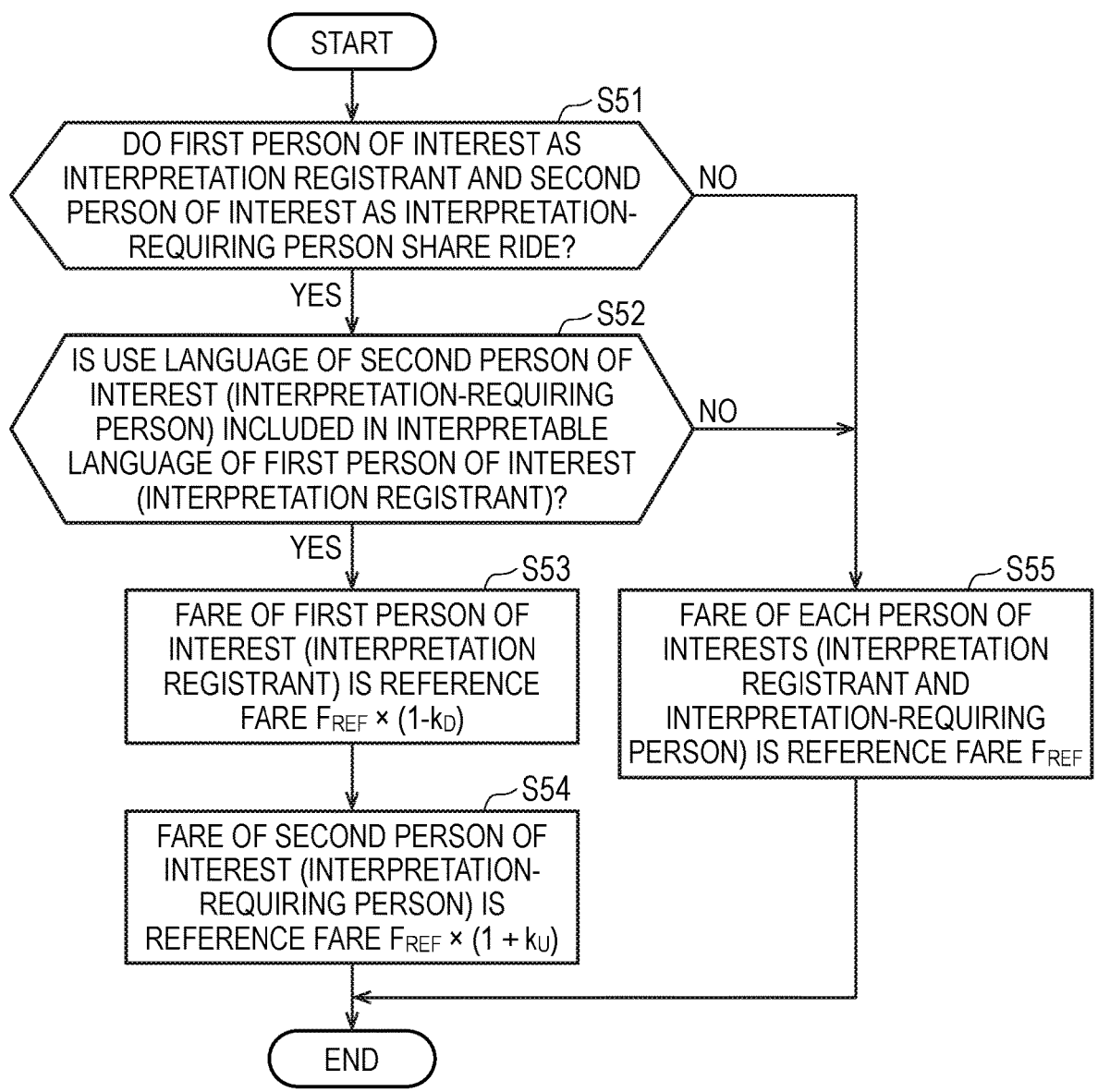
FIG. 21 is a flowchart illustrating a method of calculating a fare of an interpretation registrant and an interpretation-requiring person according to the seventh example belonging to the embodiment of the present invention.

A method of calculating fares of an interpretation-requiring person and an interpretation registrant will be described with reference to FIG. 21. Both the extra-fare setting for an interpretation-requiring person and a discount setting for an interpretation registrant may be performed, and it is assumed that both the extra-fare setting and the discount setting are performed in FIG. 21. However, in the seventh example, the discount setting for the interpretation registrant may not be executed (that is, the fare of the interpretation registrant may be always set to a reference fare regardless of presence or absence of ride-sharing with the interpretation-requiring person). As described above, a reference fare of an arbitrary person of interest is calculated in accordance with a predetermined reference fare calculation condition, based on a traveling distance and traveling time of a taxi in a state where the person of interest rides in the taxi, and a getting-in place, a getting-off place, a riding start time-point, a riding end time-point, and the like of the person of interest in taking the taxi. When a pre-determined fare service is not introduced, the reference fare is calculated by a taxi meter or the in-vehicle device 30 mounted on the taxi. Here, it is considered that the pre-determined fare service is not introduced.

Now, a case where a first person of interest, as one person of interest, is an interpretation registrant and a second person of interest, as another person of interest, is an interpretation-requiring person will be considered. Then, it is assumed that a reference fare of each person of interest at the time when each person of interest moves by taxi from a specific getting-in place to a specific getting-off place under a specific riding condition is a fare $F_{REF}$. Here, the specific riding condition is a riding condition excluding presence or absence of ride-sharing between an interpretation-requiring person and an interpretation registrant, and is a condition such as a traveling distance and traveling time of a taxi in a state where a person of interest rides in the taxi, and a getting-in place, a getting-off place, a riding start time-point, and a riding end time-point of the person of interest in taking the taxi.

In this case, if each person of interest alone moves by taxi from the specific getting-in place to the specific getting-off place under the specific riding condition (N in step S51), the fare of each person of interest is the reference fare $F_{REF}$ (step S55). On the other hand, when each person of interest moves under the specific riding condition from the specific getting-in place to the specific getting-off place in a state where the first person of interest (interpretation registrant) and the second person of interest (interpretation-requiring person) share one taxi, and a use language of the second person of interest (interpretation-requiring person) is included in an interpretable language of the first person of interest (interpretation registrant) (Y in steps S51 and S52), a discount setting is performed in which a fare of the first person of interest (interpretation registrant) is $(1-k_D)$ times the reference fare $F_{REF}$ (step S53), and an extra-fare setting is performed in which a fare of the second person of interest (interpretation-requiring person) is $(1+k_U)$ times the reference fare $F_{REF}$ (step S54). Even when each person of interest moves under the specific riding condition from the specific getting-in place to the specific getting-off place in a state where the first person of interest (interpretation registrant) and the second person of interest (interpretation-requiring person) share one taxi, if the use language of the second person of interest (interpretation-requiring person) is not included in the interpretable language of the first person of interest (interpretation registrant) (Y in step S51 and N in step S52), the fare of each person of interest is the reference fare $F_{REF}$ (step S55).

When the discount rate $k_D$ is set for the first person of interest (interpretation registrant), a signal including information specifying the set discount rate $k_D$ is transmitted from the server device 20 (server communication unit 22) to the in-vehicle device 30 of the taxi that the first and second persons of interest should share. The information specifying the discount rate $k_D$ is provided from the in-vehicle device 30 of the taxi to a taxi meter thereof, so that the fare of the first person of interest (interpretation registrant) is actually set to "$F_{REF} \times -(1-k_D)$". The in-vehicle device 30 may function as a taxi meter.

When the extra-fare rate $k_U$ is set for the second person of interest (interpretation-requiring person), a signal including information specifying the set extra-fare rate $k_U$ is transmitted from the server device 20 (server communication unit 22) to the in-vehicle device 30 of the taxi that the first and second persons of interest should share. The information specifying the extra-fare rate $k_U$ is provided from the in-vehicle device 30 of the taxi to the taxi meter, so that the fare of the second person of interest (interpretation-requiring person) is actually set to "$F_{REF} \times (1+k_U)$". The in-vehicle device 30 may function as a taxi meter.

In the example of the extra-fare rate data D4 illustrated in FIG. 20, extra-fare rates $k_U$ of 10%, 15%, 20%, 20%, and 30% are set for English, Chinese, French, German, and Swahili as non-reference languages, respectively. Therefore, for example, when a use language of the person P serving as an interpretation-requiring person is Chinese and Chinese is included in an interpretable language of the person Q serving as an interpretation registrant, the extra-fare rate $k_U$ of the person P is set to 15%. Similarly, for example, when the use language of the person P serving as an interpretation-requiring person is Swahili and Swahili is included in the interpretable language of the person Q serving as an interpretation registrant, the extra-fare rate $k_U$ of the person P is set to 30%.

In a case where the extra-fare setting according to the seventh example is applied to the flow of operations of FIG. 15, the extra-fare setting processing may be performed in parallel with the discount setting processing 620 at a stage where the discount setting processing 620 of FIG. 15 is performed (the same applies to a case where the extra-fare setting according to the seventh example is applied to the flow of operations of FIG. 16). In the extra-fare setting processing, the extra-fare setting unit 21D sets the extra-fare rate $k_U$ for the person P based on the use language of the person P and interpretation ability information of the person Q.

In the operations of FIG. 15 to which the seventh example is applied, the operations following the discount setting processing 620 and the extra-fare setting processing are as described in the first example. However, information on the extra-fare rate $k_U$ is added to the vehicle dispatch instruction signal 630. That is, the content of the signal 630 includes a passenger pick-up place where a target taxi should go to pick up a passenger (corresponding to the departure place of the persons P and Q), a fact that the persons P and Q share a ride, the discount rate $k_D$ for the person Q set in the discount setting processing 620, the extra-fare rate $k_U$ set in the extra-fare setting processing, an identity verification method for the person Q (for example, presentation of a driving license), and the like. In the target taxi, the content of the signal 630 is transmitted to the driver through the interface unit 34 (for example, displayed on a display screen of the interface unit 34). The driver of the target taxi confirms the content of the signal 630 and heads for the passenger pick-up place.

In the target taxi, when the person P is to get off the taxi after the persons P and Q rides in the taxi in a shared manner, the person P is charged a fare determined after extra-fare application at the extra-fare rate $k_U$. The fare determined after extra-fare application is $(1+k_U)$ times the reference fare calculated for the person P. On the other hand, in the target taxi, when the person Q is to get off the taxi after the persons P and Q ride in the taxi in a shared manner, the person Q is charged a fare determined after discount application at the discount rate $k_D$. However, if the fare determined after discount application is zero, the person Q is not charged the fare. The fare determined after discount application is $(1-k_D)$ times the reference fare calculated for the person Q.

The extra-fare added to the fare of the person P is, so to speak, a price for interpretation, and it is possible to obtain the benefit of interpretation even if there is an extra-fare, and therefore, it is considered that a beneficial service can be constructed.

Instead of the extra-fare rate data D4, extra-fee data D4a of FIG. 22 may be stored and retained in the server storage unit 23, and the extra-fare setting for the fare of the interpretation-requiring person at the time when the interpretation-requiring person and the interpretation registrant share one taxi may be performed using the extra-fee data D4a. That is, the fare of the interpretation-requiring person in the case where the interpretation-requiring person and the interpretation registrant share one taxi as the persons P and Q may be an amount obtained by adding an extra-fee $F_U$ to the reference fare. In the extra-fee data D4a, the extra-fee $F_U$ for the fare of the interpretation-requiring person is defined for each non-reference language. When the interpretation-requiring person and the interpretation registrant share one taxi as the persons P and Q, the extra-fee $F_U$ of the interpretation-requiring person is determined based on which non-reference language the use language of the interpretation-requiring person is. "$0<F_U$" is satisfied.

When the extra-fare setting of the interpretation-requiring person by adding the extra-fee $F_U$ is performed, the operations of FIG. 21 may be performed as described below. That is, when each person of interest moves under the specific riding condition from the specific getting-in place to the specific getting-off place in a state where the first person of interest (interpretation registrant) and the second person of interest (interpretation-requiring person) share one taxi, and the use language of the second person of interest (interpretation-requiring person) is included in the interpretable language of the first person of interest (interpretation registrant) (Y in steps S51 and S52), in step S54, instead of setting the fare of the second person of interest (interpretation-requiring person) to $(1+k_U)$ times the reference fare $F_{REF}$, the fare of the second person of interest (interpretation-requiring person) may be set to $(F_{REF}+F_U)$.

When the extra-fee $F_U$ is set for the second person of interest (interpretation-requiring person), a signal including information specifying the set extra-fee $F_U$ is transmitted from the server device 20 (server communication unit 22) to the in-vehicle device 30 of the taxi that the first and second persons of interest should share. The information specifying the extra-fee $F_U$ is provided from the in-vehicle device 30 of the taxi to the taxi meter, so that the fare of the second person of interest (interpretation-requiring person) is actually set to $(F_{REF}+F_U)$. The in-vehicle device 30 may function as a taxi meter.

In the example of the extra-fee data D4*a* illustrated in FIG. 22, extra-fees $F_U$ of 500 yen, 700 yen, 900 yen, 900 yen, and 1500 yen are set for English, Chinese, French, German, and Swahili as non-reference languages, respectively. Therefore, for example, when a use language of the person P serving as an interpretation-requiring person is Chinese and Chinese is included in an interpretable language of the person Q serving as an interpretation registrant, the extra-fee $F_U$ of the person P is set to 700 yen. Similarly, for example, when the use language of the person P serving as an interpretation-requiring person is Swahili and Swahili is included in the interpretable language of the person Q serving as an interpretation registrant, the extra-fee $F_U$ of the person P is set to 1500 yen.

As described in the fourth example, the discount fee $F_D$ may be applied to the person Q serving as an interpretation registrant instead of the discount rate $k_D$ (see FIG. 17).

In addition, in the seventh example, when the pre-determined fare service described in the fifth example is used, the fare of each of the persons P and Q is calculated and determined as the pre-determined fare by the server control unit 21 instead of the taxi meter or the in-vehicle device 30 in the taxi, and information on the determined pre-determined fare is transmitted from the server device 20 to the in-vehicle device 30 of the taxi (target taxi in FIG. 15 or FIG. 16). When a reference fare calculated for the person P is set as the fare $F_{REF}$, the pre-determined fare of the person P is set to "$F_{REF} \times (1+k_U)$". Alternatively, if the discount fee $F_U$ is adopted, the pre-determined fare of the person P is set to "$(F_{REF}+F_U)$". When a reference fare calculated for the person Q is set as the fare $F_{REF}$, the pre-determined fare of the person Q is "$F_{REF} \times (1-k_D)$". Alternatively, if the discount fee $F_D$ is adopted, the pre-determined fare of the person Q is set to be a larger one of "$(F_{REF}-F_D)$" and zero.

The extra-fare rate $k_U$ or the extra-fee $F_U$ applied to the person P serving as an interpretation-requiring person may be set and changed according to an interpretation level of the person Q serving as an interpretation registrant. For example, the extra-fare rate $k_U$ or the extra-fee $F_U$ may be increased as the interpretation level of the person Q in the use language of the person P increases.

Consideration of the Present Invention

The present invention embodied in the above-described examples will be considered.

A taxi management device (20) according to an aspect of the present invention has a configuration (hereinafter, referred to as configuration $W_1$) including: an information acquisition unit (21A) that acquires first information (for example, interpretation-requiring person information on a person P) including information specifying a use language of a first person (for example, the person P serving as an interpretation-requiring person) and second information (for example, interpretation registrant information on a person Q) including information specifying an interpretable language of a second person (for example, the person Q serving as an interpretation registrant), and a discount setting unit (21C) that performs discount setting of a fare of the second person at a time when the first person and the second person share a taxi, based on the first information and the second information.

Since the first person feel anxious about a conversation in a taxi due to a language barrier, the first person may request interpretation when using a taxi. On the other hand, the second person may be able to understand the use language of the first person and interpret the use language. In this case, if the first person and the second person share a taxi, anxiety of the first person about language is eliminated. In order to contribute to promotion of ride-sharing, the taxi management device according to the configuration $W_1$ is provided with the discount setting unit. Accordingly, the anxiety of the first person about language is eliminated, and at the same time, there is a possibility that the second person can use the taxi for free or at a low fare, so that it is possible to provide a service advantageous for both.

The first information is, for example, interpretation-requiring person information on the person P. In the above-described examples, the person P is an interpretation-requiring person, and the interpretation-requiring person information on the person P may include movement request information and unique information of the person P (see step S31 of FIG. 14). The use language of the person P is specified by the unique information of the person P (see FIG. 6).

The second information is, for example, interpretation registrant information on the person Q. In the above-described examples, the person Q is an interpretation registrant, and interpretation registrant information on the person Q may include movement request information and unique information of the person Q (see step S32 of FIG. 14). An interpretable language of the person Q is specified by the unique information of the person Q (see FIGS. 7 and 8).

Figure 11:
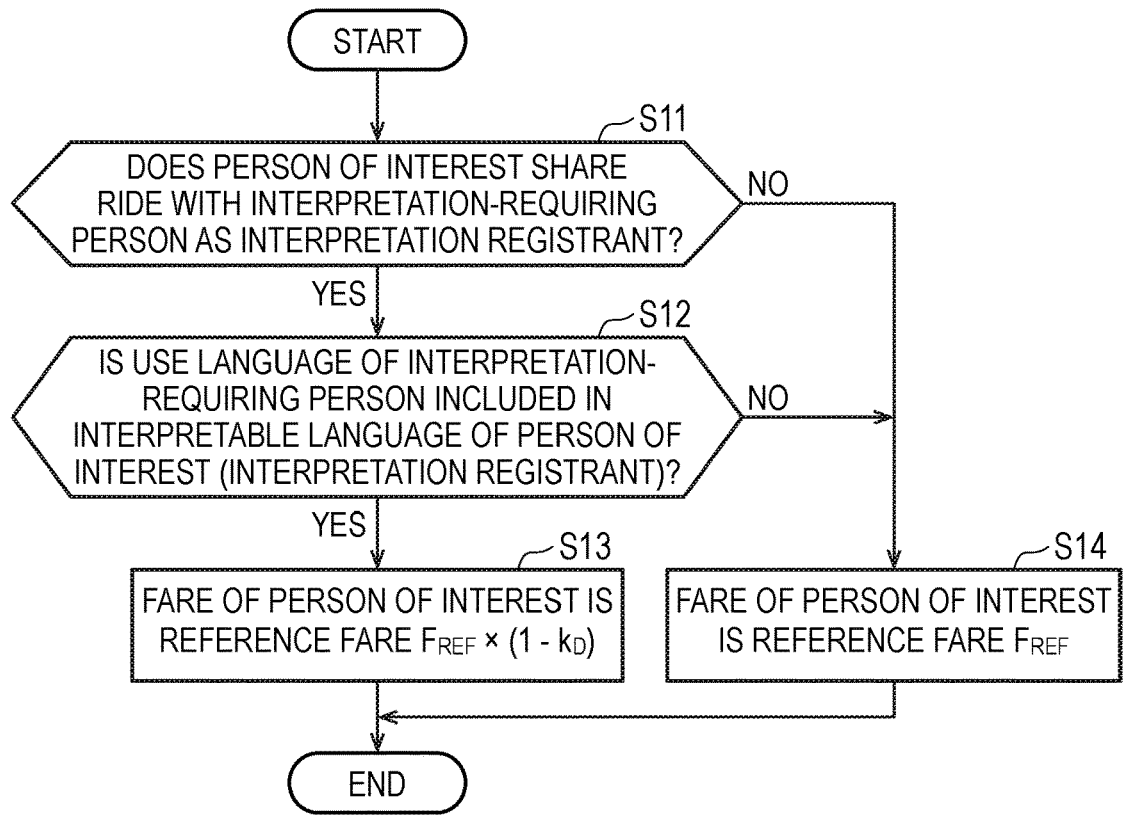
FIG. 11 is a flowchart illustrating a method of calculating a fare of a person of interest who is one interpretation registrant according to the embodiment of the present invention.

Specifically, for example, the taxi management device according to the configuration $W_1$ has a configuration (hereinafter, referred to as configuration $W_2$) in which the taxi is operated in a country where a reference language is used as an official language, the use language of the first person is different from the reference language, and the discount setting unit sets the fare of the second person at the time of ride-sharing to be lower in a case where the second person is able to perform interpretation between the reference language and the use language of the first person than when it is not the case (see FIG. 11 or FIG. 18).

Accordingly, the anxiety of the first person about language is eliminated, and at the same time, the second person able to perform interpretation can use the taxi for free or at a low fare, so that it is possible to provide a service that is advantageous for both.

In addition, for example, the taxi management device according to configuration $W_2$ may have a configuration (hereinafter, referred to as configuration $W_3$) in which in the case where the second person is able to perform interpretation between the reference language and the use language of the first person, a proficiency level (interpretation level) of the interpretation is also included in the second information (see FIGS. 7 and 8), and the discount setting unit performs discount setting of the fare of the second person at the time of ride-sharing according to the proficiency level of the interpretation (see FIGS. 10 and 11 or FIGS. 17 and 18).

Accordingly, it is possible to perform an appropriate discount setting according to the proficiency level (interpretation level) of interpretation. For example, when the proficiency level of interpretation is high and high quality interpretation is possible, it is possible to increase a degree of discount, and it is possible to make a magnitude of discount, which should be considered as a price for interpretation, appropriate.

Specifically, for example, the taxi management device according to configuration $W_3$ may have a configuration (hereinafter, referred to as configuration $W_4$) in which when the second person is able to perform interpretation between the reference language and the use language of the first person, the discount setting unit reduces the fare of the second person at the time of ride-sharing to be lower as the proficiency level increases (see FIGS. 10 and 11 or FIGS. 17 and 18).

Specifically, for example, the taxi management device according to configuration $W_3$ or $W_4$ may have a configuration (hereinafter, referred to as configuration $W_5$) in which there is provided an interpretation ability information registration unit (23) that registers and retains interpretation ability information of each of a plurality of interpretation registrants including the second person (for example, person Q), the interpretation ability information specifies an interpretable language of the interpretation registrant for each interpretation registrant, interpretation of the interpretable language is interpretation between the reference language and a non-reference language, a proficiency level of interpretation is defined for each interpretation registrant and for each interpretable language in the interpretation ability information, and the second information includes the interpretation ability information of the second person (see FIGS. 7 and 8).

Accordingly, it is possible to set an appropriate discount according to the proficiency level (interpretation level) of interpretation, for each interpretation registrant and for each interpretable language.

The interpretation ability information registration unit is configured with the server storage unit 23 in the above-described examples, and the interpretation ability information of each of the plurality of interpretation registrants including the second person is registered and retained by storage of the interpretation registrant data D2 in the server storage unit 23.

Various modifications can be appropriately made to the examples of the present invention within the scope of the technical idea shown in the claims. The above examples are merely an example of the embodiment of the present invention, and the meaning of the present invention and the terms of the constituent elements is not limited to that described in the above examples. The specific numerical values shown in the above description are merely examples, and can be changed to various numerical values as a matter of course.

What is claimed is:

1. A taxi management system, comprising:
at least one hardware processor configured to:
acquire, from a first terminal of a first person, a taxi dispatch request and first information including information specifying a use language of the first person and, from a second terminal of a second person, second information including information specifying an interpretable language of the second person;
select the first person, and select a user as the second person who is able to perform interpretation between a reference language used as an official language and the use language of the first person, based on a departure place and a destination of the first person and the second person, the use language of the first person, and the interpretable language of the second person;
select a taxi for the first person and the second person, based on the departure place and the destination of the first person and the second person;
perform discount setting of a fare of the second person at a time of ride-sharing of the taxi by the first person and the second person based on the first information and the second information;
transmit, to the second terminal, an inquiry signal to notify the second person of the ride-sharing of the taxi with the first person and the fare of the second person,
receive an approval signal from the second terminal in response to the inquiry signal being transmitted; and
transmit a vehicle dispatch completion signal to the first terminal, after receiving the approval signal,
wherein the taxi management system further comprises an in-vehicle device that is mounted on the taxi and is communicable with the at least one hardware processor, and
wherein the at least one hardware processor is further configured to transmit a vehicle dispatch signal to the in-vehicle device of the taxi, after receiving the approval signal, and
wherein the in-vehicle device that is mounted on the taxi includes a display that displays information related to the vehicle dispatch signal in response to receiving the vehicle dispatch signal.

2. The taxi management system according to claim 1, wherein
the taxi is operated in a country where the reference language is used as the official language,
the use language of the first person is different from the reference language, and
the at least one hardware processor sets the fare of the second person at the time of the ride-sharing to be lower in a case where the second person is able to perform interpretation between the reference language and the use language of the first person than a fare of the second person in a case where the second person is not able to perform interpretation between the reference language and the use language of the first person.

3. The taxi management system according to claim 2, wherein
the second information includes a proficiency level of interpretation of the second person, and
in a case where the second person is able to perform interpretation between the reference language and the use language of the first person, the at least one hardware processor performs discount setting of the fare of the second person at the time of the ride-sharing according to the proficiency level of the interpretation.

4. The taxi management system according to claim 3, wherein,
in a case where the second person is able to perform interpretation between the reference language and the use language of the first person, the at least one hardware processor sets the fare of the second person at the time of the ride-sharing to be lower as the proficiency level increases.

5. The taxi management system according to claim 3, wherein
the at least one hardware processor is further configured to register and retain interpretation ability information of each of a plurality of interpretation registrants including the second person, and,
in the interpretation ability information, an interpretable language is specified for each interpretation registrant, interpretation of the interpretable language is interpretation between the reference language and a non-reference language, a proficiency level of interpretation is defined for each interpretation registrant and for each interpretable language in the interpretation ability information, and the second information includes the interpretation ability information of the second person.

6. The taxi management system according to claim 4, wherein:

the at least one hardware processor is further configured to register and retain interpretation ability information of each of a plurality of interpretation registrants including the second person, wherein, in the interpretation ability information, an interpretable language is specified for each interpretation registrant, interpretation of the interpretable language is interpretation between the reference language and a non-reference language, a proficiency level of interpretation is defined for each interpretation registrant and for each interpretable language in the interpretation ability information, and the second information includes the interpretation ability information of the second person.

7. The taxi management system according to claim 5, wherein the at least one hardware processor is further configured to select, based on matching information, the first person from among a plurality of users including one or more interpretation registrants, and selects a user as the second person who is able to perform interpretation between the reference language and the use language of the first person, and the matching information includes a departure place and a destination of each user in taking the taxi, a use language of each user, and interpretation ability information of the one or more interpretation registrants.

8. The taxi management system according to claim 6, wherein the at least one hardware processor is further configured to select, based on matching information, the first person from among a plurality of users including one or more interpretation registrants, and selects a user as the second person who is able to perform interpretation between the reference language and the use language of the first person, and the matching information includes a departure place and a destination of each user in taking the taxi, a use language of each user, and interpretation ability information of the one or more interpretation registrants.

9. The taxi management system according to claim 1, wherein the at least one hardware processor is further configured to transmit a result of the discount setting to the in-vehicle device mounted on the taxi.

10. The taxi management system according to claim 2, wherein:

the at least one hardware processor is further configured to perform extra-fare setting of a fare of the first person at a time of ride-sharing of taxi by the first person and the second person based on the first information and the second information, the at least one hardware processor sets the fare of the first person at the time of the ride-sharing to be higher in a case where the second person is able to perform interpretation between the reference language and the use language of the first person than a fare of the first person in a case where the second person is not able to perform interpretation between the reference language and the use language of the first person.

11. The taxi management system according to claim 10, wherein:

the at least one hardware processor is further configured to transmit a result of the extra-fare setting to the in-vehicle device mounted on the taxi.

12. A fare setting method comprising:

with at least one hardware processor:

acquiring, from a first terminal of a first person, a taxi dispatch request and first information including information specifying a use language of the first person and, from a second terminal of a second person, second information including information specifying an interpretable language of the second person;

selecting the first person, and select a user as the second person who is able to perform interpretation between a reference language used as an official language and the use language of the first person, based on a departure place and a destination of the first person and the second person, the use language of the first person, and the interpretable language of the second person;

selecting a taxi for the first person and the second person, based on the departure place and the destination of the first person and the second person;

based on the first information and the second information, performing discount setting of a fare of the second person at a time of ride-sharing of taxi by the first person and the second person based on the first information and the second information; and transmitting, to the second terminal, an inquiry signal to notify the second person of the ride-sharing of taxi with the first person and the fare of the second person;

receiving an approval signal from the second terminal in response to the inquiry signal being transmitted; and transmitting a vehicle dispatch completion signal to the first terminal, after receiving the approval signal, wherein the taxi includes an in-vehicle device that is mounted on the taxi and is communicable with the at least one hardware processor, and wherein the at least one hardware processor transmits a vehicle dispatch signal to the in-vehicle device of the taxi, after receiving the approval signal, and wherein the in-vehicle device that is mounted on the taxi includes a display that displays information related to the vehicle dispatch signal in response to receiving the vehicle dispatch signal.

13. The taxi management system according to claim 1, wherein the in-vehicle device comprises a GPS processing unit, the GPS processing unit is configured to detect location information of the taxi at a predetermined cycle and transmit the location information, and the at least one hardware processor is configured to select the taxi based on the location information.

\* \* \* \* \*